US011182258B2

(12) United States Patent
Knestele et al.

(10) Patent No.: US 11,182,258 B2
(45) Date of Patent: Nov. 23, 2021

(54) DATA REBUILD USING DYNAMIC PEER WORK ALLOCATION

(71) Applicant: Western Digital Technologies, Inc., San Jose, CA (US)

(72) Inventors: Gunter Knestele, Costa Mesa, CA (US); Maliheh Sarikhani, Irvine, CA (US); Mary Barrington, Dana Point, CA (US); Jeff Furlong, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 114 days.

(21) Appl. No.: 16/240,274

(22) Filed: Jan. 4, 2019

(65) Prior Publication Data

US 2020/0218617 A1 Jul. 9, 2020

(51) Int. Cl.
*G06F 11/14* (2006.01)
*G06F 16/22* (2019.01)
*G06F 9/50* (2006.01)
*G06F 16/27* (2019.01)

(52) U.S. Cl.
CPC ........ *G06F 11/1469* (2013.01); *G06F 9/5027* (2013.01); *G06F 9/5077* (2013.01); *G06F 16/2272* (2019.01); *G06F 16/278* (2019.01); *G06F 2201/80* (2013.01)

(58) Field of Classification Search
CPC .............. G06F 3/0653; G06F 11/3409; G06F 11/1469; G06F 16/2272; G06F 16/278; G06F 9/5027; G06F 9/5077; G06F 2201/80
See application file for complete search history.

(56) References Cited

U.S. PATENT DOCUMENTS

| | | | |
|---|---|---|---|
| 5,388,083 A | 2/1995 | Assar et al. | |
| 5,530,948 A | 6/1996 | Islam | |
| 5,680,539 A | 10/1997 | Jones | |
| 5,742,752 A | 4/1998 | DeKoning | |
| 6,092,215 A | 7/2000 | Hodges et al. | |

(Continued)

FOREIGN PATENT DOCUMENTS

| | | |
|---|---|---|
| EP | 2626780 B1 | 11/2019 |
| WO | 2014110095 A1 | 7/2014 |
| WO | 2015116197 A1 | 8/2015 |

OTHER PUBLICATIONS

Amvrosiadis et al., Practical Scrubbing: Getting to the bad sector at the right time, 2012, IEEE, pp. 1-12. (Year: 2012).

(Continued)

*Primary Examiner* — Matthew M Kim
*Assistant Examiner* — Matthew N Putaraksa
(74) *Attorney, Agent, or Firm* — Patent Law Works LLP

(57) ABSTRACT

Example peer storage systems, storage devices, and methods provide data rebuild across a peer communication channel using dynamic work allocation. A rebuild coordinator among the peer storage devices identifies peer storage devices including data units for the rebuild operation. The rebuild coordinator determines work profiles for the peer storage devices and uses the work profiles to determine the rebuild queue for the data units. The data is rebuilt according to the rebuild queue using the data units from the peer storage devices.

20 Claims, 7 Drawing Sheets

(56) References Cited

U.S. PATENT DOCUMENTS

| | | | |
|---|---|---|---|
| 6,516,350 B1* | 2/2003 | Lumelsky | H04L 29/06 709/224 |
| 6,647,514 B1* | 11/2003 | Umberger | G06F 11/1092 714/42 |
| 6,738,937 B1 | 5/2004 | Bergsten | |
| 7,293,133 B1 | 11/2007 | Colgrove et al. | |
| 7,434,107 B2 | 10/2008 | Marks | |
| 7,454,655 B2 | 11/2008 | Werner et al. | |
| 7,571,344 B2 | 8/2009 | Hughes et al. | |
| 7,620,841 B2 | 11/2009 | Chen et al. | |
| 7,680,837 B2 | 3/2010 | Yamato | |
| 7,693,847 B1* | 4/2010 | Brown | G06F 9/5038 707/694 |
| 7,783,600 B1 | 8/2010 | Spertus et al. | |
| 7,840,546 B2* | 11/2010 | Oliver | G06F 16/2246 707/705 |
| 7,934,055 B2* | 4/2011 | Flynn | G06F 12/0804 711/114 |
| 7,984,328 B1 | 7/2011 | Coatney | |
| 8,086,911 B1 | 12/2011 | Taylor | |
| 8,289,641 B1 | 10/2012 | Emami | |
| 8,473,648 B2 | 6/2013 | Chakhaiyar et al. | |
| 8,583,853 B1 | 11/2013 | Lee et al. | |
| 8,838,931 B1 | 9/2014 | Marshak et al. | |
| 8,904,261 B2 | 12/2014 | Cideciyan et al. | |
| 9,116,624 B2 | 8/2015 | Canepa et al. | |
| 9,118,698 B1 | 8/2015 | Radovanovic | |
| 9,122,587 B2 | 9/2015 | Baryudin et al. | |
| 9,417,821 B2 | 8/2016 | Slaight et al. | |
| 9,448,924 B2 | 9/2016 | Sundaram et al. | |
| 9,720,601 B2 | 8/2017 | Gupta et al. | |
| 9,785,480 B2 | 10/2017 | Kamawat et al. | |
| 9,894,141 B2 | 2/2018 | Hesselink et al. | |
| 9,971,515 B2 | 5/2018 | Chang et al. | |
| 10,042,721 B2 | 8/2018 | Condict et al. | |
| 10,241,722 B1 | 3/2019 | Malwankar et al. | |
| 10,289,507 B1 | 5/2019 | Malwankar et al. | |
| 10,379,948 B2 | 8/2019 | O'Krafka et al. | |
| 10,394,634 B2 | 8/2019 | Reddy | |
| 10,409,769 B1 | 9/2019 | Malhotra et al. | |
| 10,474,528 B2 | 11/2019 | Bolkhovitin et al. | |
| 2001/0039575 A1* | 11/2001 | Freund | G06F 9/5027 709/223 |
| 2002/0162075 A1 | 10/2002 | Talagala et al. | |
| 2003/0135514 A1 | 7/2003 | Patel et al. | |
| 2003/0163649 A1* | 8/2003 | Kapur | G06F 12/0862 711/146 |
| 2004/0114728 A1* | 6/2004 | Schlegel | G06T 11/006 378/65 |
| 2004/0210711 A1* | 10/2004 | Kakihara | G06F 3/0674 711/112 |
| 2005/0028048 A1 | 2/2005 | New et al. | |
| 2005/0080991 A1 | 4/2005 | Keohane et al. | |
| 2005/0114448 A1 | 5/2005 | Skomra | |
| 2005/0114726 A1 | 5/2005 | Ouchi | |
| 2006/0031722 A1 | 2/2006 | Kolvick et al. | |
| 2006/0123142 A1 | 6/2006 | Duncan et al. | |
| 2007/0226413 A1 | 9/2007 | Elliott et al. | |
| 2007/0245082 A1 | 10/2007 | Margolus et al. | |
| 2008/0005382 A1 | 1/2008 | Mimatsu | |
| 2008/0034153 A1 | 2/2008 | Lee et al. | |
| 2008/0250057 A1 | 10/2008 | Rothstein et al. | |
| 2009/0070539 A1 | 3/2009 | Haustein et al. | |
| 2009/0132760 A1 | 5/2009 | Flynn et al. | |
| 2009/0150605 A1 | 6/2009 | Flynn et al. | |
| 2009/0307426 A1 | 12/2009 | Galloway et al. | |
| 2010/0011129 A1* | 1/2010 | Bita | G06F 3/0689 710/5 |
| 2010/0251073 A1 | 9/2010 | Stolowitz | |
| 2010/0280998 A1 | 11/2010 | Goebel et al. | |
| 2010/0312873 A1* | 12/2010 | Loboz | H04L 41/5035 709/224 |
| 2011/0029711 A1 | 2/2011 | Dhuse et al. | |
| 2011/0050713 A1* | 3/2011 | McCrary | G06F 9/3851 345/522 |
| 2011/0055178 A1 | 3/2011 | Mark | |
| 2011/0093742 A1 | 4/2011 | Shinozaki | |
| 2012/0011200 A1 | 1/2012 | Zhang et al. | |
| 2012/0079317 A1 | 3/2012 | Nelogal et al. | |
| 2012/0179869 A1 | 7/2012 | Flynn et al. | |
| 2012/0284460 A1 | 11/2012 | Guda | |
| 2013/0073894 A1 | 3/2013 | Xavier et al. | |
| 2013/0179753 A1 | 7/2013 | Flynn et al. | |
| 2013/0339599 A1 | 12/2013 | Sundrani | |
| 2014/0012906 A1 | 1/2014 | Teja et al. | |
| 2014/0101369 A1 | 4/2014 | Tomlin et al. | |
| 2014/0365719 A1 | 4/2014 | Kuzmin et al. | |
| 2014/0164612 A1* | 6/2014 | Hillier | H04L 41/147 709/224 |
| 2014/0181041 A1 | 6/2014 | Whitehead et al. | |
| 2014/0181575 A1 | 6/2014 | Kalach et al. | |
| 2014/0237298 A1 | 8/2014 | Pe | |
| 2014/0258598 A1 | 9/2014 | Canepa et al. | |
| 2014/0330973 A1* | 11/2014 | Freimuth | H04B 10/27 709/226 |
| 2014/0379671 A1 | 12/2014 | Barrus et al. | |
| 2015/0067244 A1 | 3/2015 | Kruger | |
| 2015/0205668 A1 | 7/2015 | Sundaram et al. | |
| 2016/0070652 A1 | 3/2016 | Sundararaman et al. | |
| 2016/0092309 A1 | 3/2016 | Gao et al. | |
| 2016/0234172 A1 | 8/2016 | Agarwal et al. | |
| 2016/0335208 A1 | 11/2016 | Slaight et al. | |
| 2016/0342476 A1 | 11/2016 | Nazari et al. | |
| 2017/0116074 A1 | 4/2017 | Hayes et al. | |
| 2017/0242744 A1 | 8/2017 | Wang et al. | |
| 2017/0270018 A1 | 9/2017 | Xiao et al. | |
| 2017/0286237 A1 | 10/2017 | Condict et al. | |
| 2017/0329542 A1 | 11/2017 | Chou et al. | |
| 2018/0018231 A1 | 1/2018 | Okada et al. | |
| 2018/0024964 A1 | 1/2018 | Mao et al. | |
| 2018/0032446 A1 | 2/2018 | Amarendran et al. | |
| 2018/0046581 A1* | 2/2018 | Banerjee | G06F 12/1009 |
| 2018/0054217 A1 | 2/2018 | Schwaderer | |
| 2018/0088860 A1* | 3/2018 | Erickson | G06F 3/061 |
| 2018/0101450 A1* | 4/2018 | Park | G06F 11/1662 |
| 2018/0286210 A1* | 10/2018 | Frascati-Robinson | G08B 25/08 |
| 2019/0042452 A1* | 2/2019 | Clark | G06F 3/0625 |
| 2019/0102249 A1 | 4/2019 | Bolkhovitin et al. | |
| 2019/0102250 A1 | 4/2019 | O'Krafka et al. | |
| 2019/0332263 A1* | 10/2019 | Chopra | G06F 3/0653 |
| 2019/0354496 A1* | 11/2019 | Nielsen | G06F 3/0656 |
| 2020/0026426 A1* | 1/2020 | Ma | G06F 3/064 |

OTHER PUBLICATIONS

International Search Report and Written Opinion of Application No. PCT/US2019/035060, dated Sep. 16, 2019, 8 pages.

International Search Report and Written Opinion of Application No. PCT/US2019/063104, dated Jan. 23, 2020, 11 pages.

International Search Report and Written Opinion of Application No. PCT/US2019/035087, dated Sep. 25, 2019, 11 pages.

International Search Report and Written Opinion of Application No. PCT/US2019/035088, dated Sep. 26, 2019, 10 pages.

IP.Com, Peer-to-Peer Hard Disk Drive, Apr. 24, 2006, IP.com, pp. 1-3. (Year: 2006).

Xiang, Liping, et al., Optimal Recovery of Single Disk Failure in RDP Code Storage Systems, Jun. 18, 2010, http://citeseerx.ist.psu.edu/viewdoc/download?doi=10.1.1.331.4168&rep=rep1&type=pdf.

International Search Report and Written Opinion of Internationals Application No. PCT/US2019/035085, dated Sep. 18, 2019, 8 pages.

A Survey of Peer-to-Peer Storage Techniques for Distributed File Systems, ITCC '05 Proceedings of the International Conference on Information Technology: Coding and Computing (ITCC'05)—vol. 02, Apr. 4, 2005, 9 pages.

About the IBM Cloud Storage API. Sep. 28, 2018. https://console.bluemix.net/docs/services/cloud-object-storage/api-reference/about-api.html#about-the-ibm-cloud-object-storage-api.

(56) References Cited

OTHER PUBLICATIONS

Ahluwalia, G., United States, White Paper. Event Stream Processor as seen by SAP, An evolution of event driven architecture, pp. 1-11.

Bulk Delete. OpenStack Docs: OpenStack Security Guide, docs.openstack.org/ocata/user-guide/cli-swift-bulk-delete.html.

Donard: NVM Express for Peer-2-Peer between SSDs and other PCIe Devices, Storage Developer Conference, SNIA Santa Clara, 2015, 18 pages.

Drobo creator announces Transporter, the private cloud storage solution, May 28, 2013, <https://www.bit-tech.net/news/transporter-private-cloud-storage-drobo-cre/1/>, 2 pages.

Hightower, R., et al., Analytics with Apache Spark Tutorial Part 2: Spark SQL—DZone Big Data, Dzone.com, Nov. 3, 2015, dzone.com/articles/analytics-with-apache-spark-tutorial-part-2-spark.

International Search Report and Written Opinion of Internationals Application No. PCT/US2018/062498, dated Mar. 12, 2019, 20 pages.

Moatti, Yosef & Rom, et al., 2017, Too Big to Eat: Boosting Analytics Data Ingestion from Object Stores with Scoop, https://www.researchgate.net/.

Object Operations. Sep. 28, 2018, https://console.bluemix.net/docs/services/cloud-object-storage/api-reference/api-reference-objects.html#object-operations.

SCSI Sense Key Error Guide, Sun Microsystems, Inc., Part No. 817-5918-10, Feb. 2004, Revision A, 16 pages.

Using Oracle Cloud Infrastructure Object Storage Classic, Deleting Multiple Objects in a Single Operation, Mar. 28 2018, https://docs.oracle.com/en/cloud/iaas/storage-cloud/cssto/deleting-multiple-objects-single-operation.html.

Wikipedia, The Free Encyclopedia, Key Code Qualifier, Retrieved Jul. 10, 2018, <https://en.wikipedia.org/wiki/Key_Code_Qualifier>, 8 pages.

Zhang, Jiacheng, et al., ParaFS: A Log-Structured File System to Exploit the Internal Parallelism of Flahs Devices, USENIX Annual Technical Conference, Jun. 22-24, 2016, 15 pages.

\* cited by examiner

DATA REBUILD USING DYNAMIC PEER WORK ALLOCATION

TECHNICAL FIELD

The present disclosure generally relates to data storage systems, and in a more particular example, to data storage systems with peer-to-peer operations.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Some multi-device storage systems employ storage devices capable of communicating with one another over the interconnecting fabric and/or network fabric. In some cases, these storage devices may be capable of peer-to-peer communication without the involvement of a storage control plane, such as a storage controller or host controller, as an intermediary. These peer storage devices may be capable of exchanging messages and/or transferring host data across the interconnecting fabric independent of the storage control plane. Reducing communication, data transfer, processing, and/or data management at the storage control plane may reduce bottlenecks and improve scalability as the number and capacity of storage devices increases.

Any given storage device may have limited options for recovering lost or corrupted data. In some storage arrays, a RAID controller or other storage controller may be needed for the storage device to take advantage of mirrored data, parity information, and/or other information stored on other storage devices in the storage array. In some cases, the storage device may be limited to reporting the error to the storage control plane and waiting for the storage control plane to initiate data recovery. In some cases, the only available recovery may be a complete or partial RAID rebuild of the storage device. This reliance on the storage control plane may create bottlenecks and this problem may only get worse as the capacity of storage devices and storage systems scales.

In some cases, a storage device may be able to rebuild itself. Unlike a storage controller involved in read/write requests of all storage devices in the array, a rebuilding storage device may not know what other storage devices in the array are doing. This may create inefficiencies as the rebuilding storage device may have to wait for busy peer storage devices to finish other work before providing data needed for a rebuild.

Therefore, there still exists a need for storage architectures that enable efficient peer-to-peer data rebuild.

SUMMARY

Various aspects for peer operations among peer storage devices, particularly, peer data rebuild are described. One general aspect includes a storage device that includes a processor, a memory, at least one storage medium, an interface configured to communicate with a plurality of peer storage devices over a peer communication channel, and a rebuild coordinator stored in the memory and executable by the processor to perform operations including: identifying at least one peer storage device from the plurality of peer storage devices, where the at least one peer storage device includes at least one target data unit for a data rebuild operation; determining, using the peer communication channel, a work profile for the at least one peer storage device; determining a rebuild queue for the data rebuild operation using the work profile, where the rebuild queue orders a plurality of rebuild data units for the data rebuild operation; rebuilding, using the peer communication channel, the plurality of rebuild data units according to the rebuild queue.

Implementations may include one or more of the following features. The rebuild coordinator may be further executable to perform operations including: identifying a first peer storage device from the plurality of peer storage devices, where the first peer storage device includes a first target data unit for the data rebuild operation; determining, using the peer communication channel, a first work profile for the first peer storage device; identifying a second peer storage device from the plurality of peer storage devices, where the second peer storage device includes a second target data unit for the data rebuild operation; and determining, using the peer communication channel, a second work profile for the second peer storage device. Determining the rebuild queue may also include ordering, based on a comparison of the first work profile and the second work profile, the plurality of rebuild data units. Determining the work profile for the at least one peer storage device may include: querying the at least one peer storage device with a work status request; receiving, in response to the work status request, work status data; and storing the work status data in the work profile. The at least one peer storage device may include a plurality of target data units for the data rebuild operation and the work status data may include a command queue count for each of the plurality of target data units. The plurality of peer storage devices may each include a plurality of target data units for the data rebuild operation. The rebuild coordinator may be further executable to perform operations including: determining work profiles for each of the plurality of peer storage devices; and mapping the work profiles for each of the plurality of peer storage devices to the plurality of target data units for the data rebuild operation. Determining the rebuild queue may include: comparing the work profiles corresponding to each of the plurality of target data units; and ordering, responsive to comparing the work profiles, the plurality of rebuild data units corresponding to the plurality of target data units. Comparing the work profiles may include: calculating aggregate work factors for each of the plurality of rebuild data units, where each aggregate work factor is based on the work profiles corresponding to target data units in a corresponding rebuild data unit; and ordering the plurality of rebuild data units is based on ordering aggregate work factors from lowest to highest. The plurality of peer storage devices may be configured as a redundant array of independent disks (RAID) array. The plurality of rebuild data units may be a plurality of RAID stripes. The plurality of target data units may be RAID chunks. The system may further include a work profile data structure, including: logical block addresses for the plurality of target data units; grouping information for the plurality of rebuild data units; and busyness values for the plurality of target data units.

Another general aspect includes a computer-implemented method, including: identifying at least one peer storage device from a plurality of peer storage devices, where the at least one peer storage device includes at least one target data unit for a data rebuild operation; querying the at least one peer storage device for work status data; determining, based on the work status data, a work profile for the at least one peer storage device; selecting a next rebuild data unit for the data rebuild operation using the work profile, where the next data rebuild unit is selected from a plurality of rebuild data units for the data rebuild operation; and rebuilding the next rebuild data unit.

Implementations may include one or more of the following features. The computer-implemented method may further include: identifying a first peer storage device from the plurality of peer storage devices, where the first peer storage device includes a first target data unit for the data rebuild operation; determining a first work profile for the first peer storage device; identifying a second peer storage device from the plurality of peer storage devices, where the second peer storage device includes a second target data unit for the data rebuild operation; determining a second work profile for the second peer storage device; and comparing the first work profile to the second work profile, where selecting the next rebuild data unit is responsive to comparing the first work profile to the second work profile. Determining the work profile for the at least one peer storage device may include: querying the at least one peer storage device with a work status request; receiving, in response to the work status request, work status data; and storing the work status data in the work profile. The at least one peer storage device may include a plurality of target data units for the data rebuild operation and the work status data may include a command queue count for each of the plurality of target data units. The computer-implemented method may further include: determining work profiles for each of the plurality of peer storage devices, where each of the plurality of peer storage devices include a plurality of target data units; mapping the work profiles for each of the plurality of peer storage devices to the plurality of target data units for the data rebuild operation; comparing the work profiles corresponding to each of the plurality of target data units; and determining, responsive to comparing the work profiles, a rebuild queue for the data rebuild operation, where the rebuild queue orders the plurality of rebuild data units for the data rebuild operation and the next rebuild data unit is selected from the rebuild queue. The computer-implemented method may further include: calculating aggregate work factors for each of the plurality of rebuild data units, where each aggregate work factor is based on the work profiles corresponding to target data units in a corresponding rebuild data unit; and ordering aggregate work factors from lowest to highest, where determining the rebuild queue is responsive to ordering aggregate work factors.

Another general aspect includes a storage system including a plurality of peer storage devices, where each of the plurality of peer storage devices includes: means for identifying at least one peer storage device from the plurality of peer storage devices, where the at least one peer storage device includes at least one target data unit for a data rebuild operation; means for determining a work profile for the at least one peer storage device; means for selecting a next rebuild data unit for the data rebuild operation using the work profile, where the next rebuild data unit is selected from a plurality of rebuild data units for the data rebuild operation; and means for rebuilding the next rebuild data unit.

Implementations may include one or more of the following features. The storage system where each of the plurality of peer storage devices may further include: means for identifying a first peer storage device from the plurality of peer storage devices, where the first peer storage device includes a first target data unit for the data rebuild operation; means for determining a first work profile for the first peer storage device; means for identifying a second peer storage device from the plurality of peer storage devices, where the second peer storage device includes a second target data unit for the data rebuild operation; means for determining a second work profile for the second peer storage device; and means for comparing the first work profile to the second work profile, where selecting the next rebuild data unit is responsive to comparing the first work profile to the second work profile. The means for determining the work profile for the at least one peer storage device may include: querying the at least one peer storage device with a work status request; receiving, in response to the work status request, work status data; and storing the work status data in the work profile. The at least one peer storage device may include a plurality of target data units for the data rebuild operation and the work status data may include a command queue count for each of the plurality of target data units. Each of the plurality of peer storage devices may further include: means for determining work profiles for each of the plurality of peer storage devices, where each of the plurality of peer storage devices include a plurality of target data units; means for mapping the work profiles for each of the plurality of peer storage devices to the plurality of target data units for the data rebuild operation; and means for determining, based on the work profiles, a rebuild queue for the data rebuild operation, where the rebuild queue orders the plurality of rebuild data units for the data rebuild operation and the next rebuild data unit is selected from the rebuild queue. The means for determining the rebuild queue may include: calculating aggregate work factors for each of the plurality of rebuild data units, where each aggregate work factor is based on the work profiles corresponding to target data units in a corresponding rebuild data unit; and ordering aggregate work factors from lowest to highest, where determining the rebuild queue is responsive to ordering aggregate work factors.

The various embodiments advantageously apply the teachings of multi-device peer storage systems to improve the functionality of such computer systems. The various embodiments include operations to overcome or at least reduce the issues in the previous storage systems discussed above and, accordingly, are more reliable and scalable than other computer data storage architectures for some applications. That is, the various embodiments disclosed herein include hardware and/or software with functionality to improve the reliability and scalability of peer-to-peer data rebuild operations, based on enabling dynamic work allocation for ordering a rebuild queue. Accordingly, the embodiments disclosed herein provide various improvements to storage systems.

It should be understood that language used in the present disclosure has been principally selected for readability and

DETAILED DESCRIPTION

Figure 1:
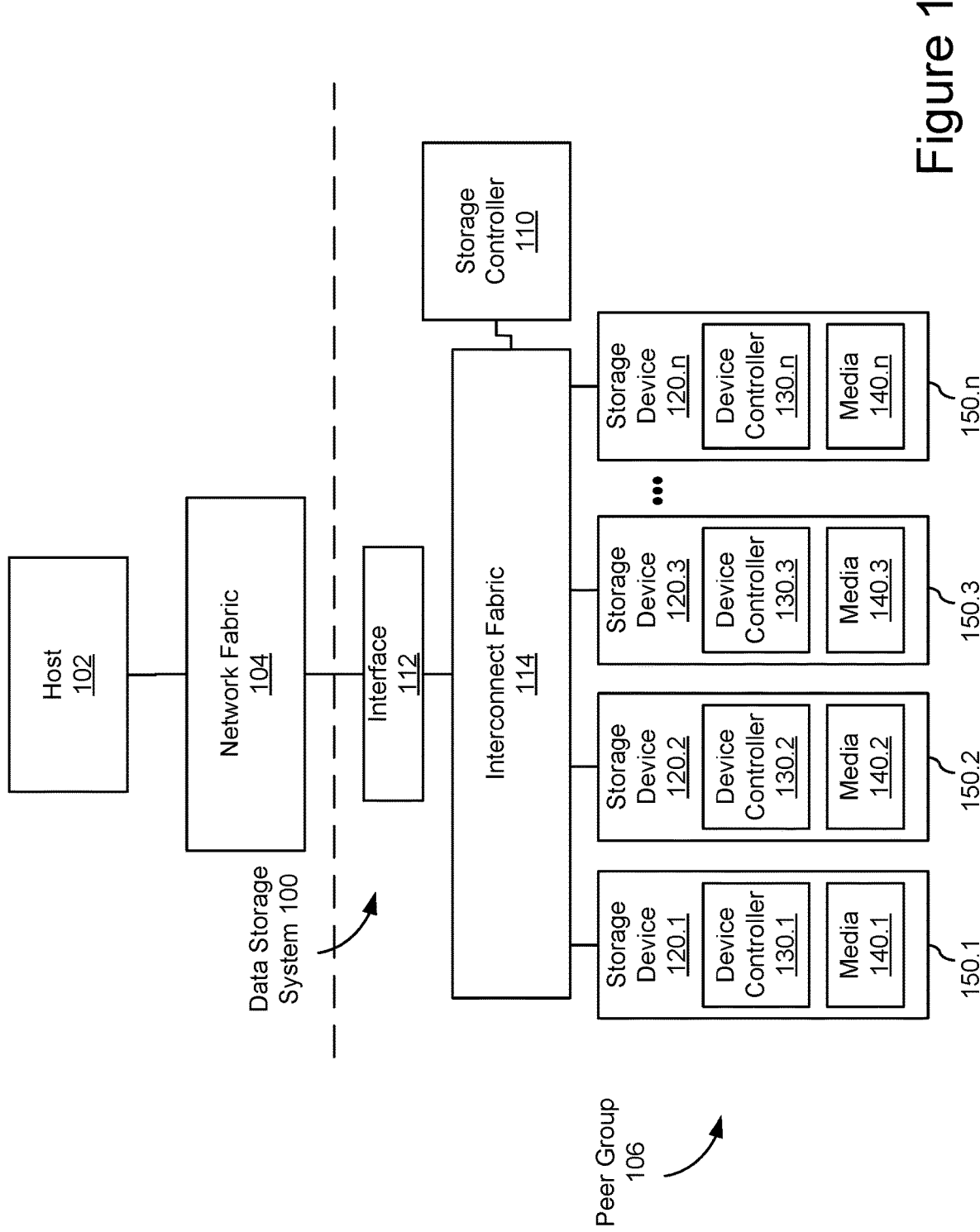
FIG. 1 schematically illustrates an example of a peer storage system.

FIG. 1 shows an embodiment of an example data storage system 100 with peer communicating data storage devices 120. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or disk drives) configured in a peer group 106.

In the embodiment shown, peer group 106 includes a number of storage devices 120 attached to a common interconnect fabric 114. For example, peer group 106 may include a number of disk drives arranged in a storage array, such as storage devices sharing a common rack or unit in a data center. In some embodiments, peer group 106 may share back plane connectivity, network switch(es), and/or other hardware and software components related to interconnect fabric 114. In some embodiments, peer groups may not be collocated in the same unit, rack, data center, or geography. For example, interconnect fabric 114, network interface 112, and network fabric 104 may enable peer-to-peer communication among storage devices over any distance and peer bonds may be established regardless (or even because of) different geographic locations, data centers, administrators, and organizations. In some embodiments, peer group 106 may be defined by peer bonds that enable peer-to-peer communication without the intervention of related storage control planes.

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing 150, such as a multi-part sealed housing with a defined form factor and ports and/or connectors for interconnecting with interconnect fabric 114.

In some embodiments, a respective data storage device 120 may include a single medium device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 is coupled to data storage devices 120.1-120.n through interconnect fabric 114. However, in some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.n, interconnect fabric 114, or interface 112. Storage controller 110 is sometimes called a controller system, a main controller system, a non-volatile memory express (NVMe) controller, garbage collection (GC) leader, or storage virtualization controller (SVC). In some embodiments, a device controller 130.1 associated with a particular storage device (e.g., 120.1) acts as storage controller 110 for other storage devices (e.g., 120-2, 120-3, and 120.n) in data storage system 100. In some embodiments, storage controller 110 is a component and/or subsystem of host 102 (described below).

In some embodiments, host 102 is coupled to data storage system 100 through network interface 112 over a network fabric 104. In some embodiments, multiple hosts 102 (only one of which is shown in FIG. 1) are coupled to data storage system 100 through network interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140.

In some embodiments, however, storage controller 110, the one or more device controllers 130, and media devices 140 are included in the same device (i.e., an integrated device) as components thereof. Furthermore, in some embodiments, one or more of the storage devices 120 (e.g., including storage controller 110, the one or more device controllers 130, and media devices 140) are embedded in a host device (e.g., host 102), such as a mobile device, tablet, other computer or computer-controlled device, and the methods described herein are performed, at least in part, by the embedded storage controller. In some embodiments, device controllers 130 are configured to both control one or more media devices 140 and provide distributed storage controller functions in conjunction with storage controller 110.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on media devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on media devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

Figure 2:
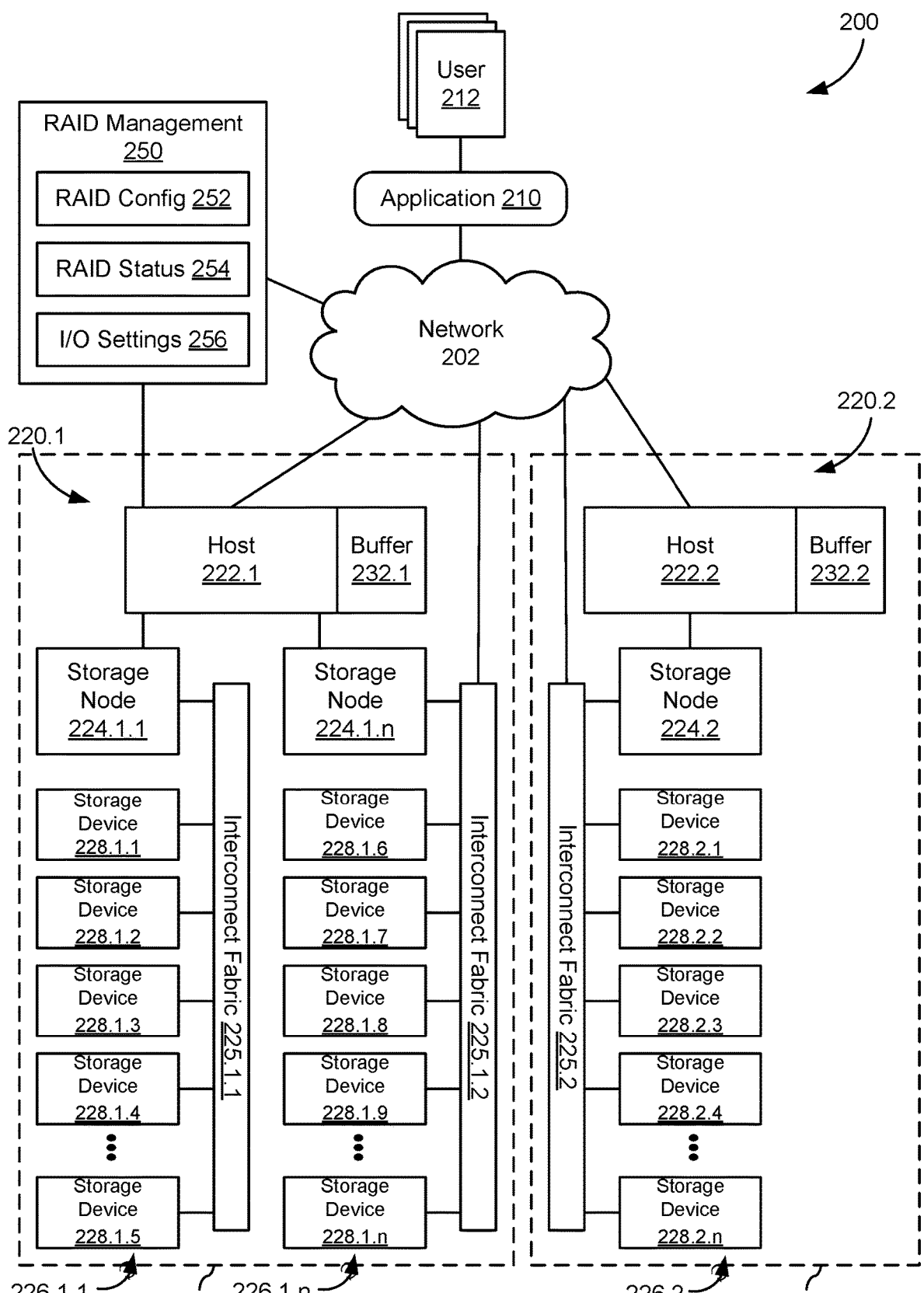
FIG. 2 schematically illustrates an example distributed storage system configuration for one or more peer storage systems.

FIG. 2 shows an embodiment of an example storage system 200, such as a global storage system implementing multiple distributed storage systems 230 in different locations 220. Storage system 200 may be implemented as a plurality of distributed storage systems 230 which is coupled to an application 210 for accessing, storing, and using data stored in storage system 200. Storage system 200 may include a plurality of storage devices 228 configured as components of disaggregated storage systems and some or all of these storage devices 228 may be configured for peer communication and allocated in one or more peer groups. In some embodiments, these peer groups may include storage devices at different physical locations 220 with different administrators. Additional remote administrators may have various responsibilities for storage system 200 and use a network-based RAID management system 250 to configure, monitor, and control data recovery across storage system 200.

The connection between storage system 200 and application 210 could, for example, be implemented as a suitable data communication network 202, such as a LAN, WAN, internet, etc. Application 210 could, for example, be a dedicated software application running on a computing device, such as a personal computer, a laptop, a wireless telephone, a personal digital assistant or any other type of communication device that is able to interface with the storage system 200. In some embodiments, application 210 could, for example, comprise a suitable file system which enables a general purpose software application to interface with storage system 200, an application programming interface (API) library for the storage system 200, etc. In some embodiments, application 210 may be a user application, such as business or personal application instantiated in a local, client/server, web, and/or mobile application that enables users 212 to interact with data stored in storage system 200.

As further shown in FIG. 2, storage system 200 comprises two storage locations 220 implementing disaggregated storage architectures. Each storage location 220 may include a host node 222 and one or more storage nodes 224 which may be coupled in a suitable way for transferring data, for example by means of interconnect fabrics 225. Each of storage nodes 224 may further connect to a plurality of storage devices 228 arranged in storage arrays 226. Host nodes 222, storage nodes 224, and storage devices 228 may connect to the data communication network 204 and each other by means of suitable wired, wireless, optical, etc. network connections or any suitable combination of such network connections.

Although the example of Figures shows only two host nodes 222, three storage nodes 224, three storage arrays 226, and fifteen storage devices 228, storage system 200 could comprise any other suitable number of host nodes 222, storage nodes 224, and storage devices 228 arranged in any number of storage arrays 226. As shown in FIG. 1, each storage array 226 may be configured as a peer group. In some embodiments, peer groups may not include every storage device in a storage array and/or peer groups may include storage devices from different arrays and/or different locations. Any number of storage devices 228 may be configured for one or more peer groups and, in some embodiments, storage devices 228 may participate in multiple peer groups at the same time.

Host nodes 222 and storage nodes 224 can be built as general-purpose computers, however more frequently they are physically adapted for arrangement in large data centers, where they are arranged in modular racks comprising standard dimensions. Exemplary host nodes 222 and storage nodes 224 may be dimensioned to take up a single unit of such rack, which is generally referred to as 1U. Such an exemplary storage node 224 may use a low-power processor and may be equipped with ten or twelve high capacity non-volatile memory express (NVMe) storage devices 228 (even though only five storage devices 228 are shown for each storage node 224) and is connectable to the network over redundant Ethernet network interfaces. In some embodiments, storage nodes 224 may include a compute complex providing storage controller or other storage-related functionality.

An exemplary host node 222 may comprise high-performance servers and provide network access to applications 210 over multiple high bandwidth Ethernet network interfaces. Data can be transferred between applications 210 and such a host node 222 by means of a variety of network protocols including hypertext transfer protocol (HTTP)/representational state transfer (REST) object interfaces, language-specific interfaces such as Microsoft .Net, Python or C, etc. Additionally, such controller nodes may comprise additional high bandwidth Ethernet ports to interface with the storage nodes 224. In some embodiments, HTTP/REST protocols complying with S3 may enable data transfer through a REST application protocol interfaces (API). Preferably, such host nodes 222 operate as a highly available cluster of host nodes, and provide for example shared access to the storage nodes 224, metadata caching, protection of metadata, etc.

Several storage nodes 224 can be grouped together, for example because they are housed in a single rack or a single physical location 220.1. For example, storage nodes 224.1.1 to 224.1.$n$ may be grouped in physical location 220.1 and support host node 202.1, while storage node 224.2 may be located in physical location 220.2 and support host node 202.2. These physical locations 220 are not required to be located at the same geographic location, they are often geographically dispersed across different data centers. For example, physical location 220.1 can be located at a data center in Europe and physical location 220.2 at a data center in China. A peer group may communicate between physical locations 220 and may engage in peer-to-peer data operations, such as data offloading or rebuild from RAID or mirrored data, across physical locations 220 through network 202. In some embodiments, an administrator in location 220.1 and an administrator in location 220.2 may not control when peer data operations occur between storage devices 228.

Host nodes 222, storage nodes 224, and/or host systems for application 210 and/or RAID management system 250, may provide a storage control plane for storage devices 228. In some embodiments, the storage control plane may include any system components that provide host read/write, RAID management, and/or storage array or storage system level data management commands that are not themselves peer storage devices. For example, the storage control plane may include a combination of storage controllers, host controllers, RAID controllers, and similar systems. The storage control plane may be distinguishable (in terms of function) from interconnect and network fabric systems that are responsible for providing physical and data layer communication between system components, which may include addressing and routing of data frames. In some embodiments, the same hardware may participate in the storage control plane and the interconnect and/or network fabric, but the storage control plane functions relate to originating and/or translating media storage related commands (session, presentation, and/or application layer activities) and are distinguishable from networking functions (physical, data link, and network layer activities). In some embodiments, peer storage devices may provide storage control commands to one another, but they are not part of the storage control plane.

In some embodiments, RAID management system 250 may be configured as an application or module in an information technology (IT) management system running on a general-purpose computer, such as such as a personal computer, a laptop, a tablet, a wireless telephone, a personal digital assistant or any other type of communication device that is able to interface with the storage system 200 and/or operational data about storage system 200 over network 202. For example, RAID management system 250 may provide a dashboard for system maps, configuration information, operating data, system/component diagnostics, performance metrics, and/or status information for storage devices 228, storage arrays 226, storage nodes 224, host nodes 222, etc. In some embodiments, RAID management system 250 may include RAID configurations, rebuild status, backup/archive configurations, storage device endurance and lifecycle management, and/or peer group configurations. RAID management system 250 may support a number of administrators with varying IT management responsibilities, including provisioning, maintenance, data management, equipment management, and related scheduling, costing, and project management.

In some embodiments, RAID management system 250 may include a RAID configuration module 252, a RAID status module 254, and input/output (I/O) settings 256. RAID configuration module 252 may include logic and data structures for managing the definition and setup of one or more RAID groups among storage devices 228. For example, RAID configuration module 252 may identify the storage devices within the RAID group, RAID level, RAID stripe and chunk sizes, mirror and/or parity settings, data scan and rebuild settings, and other parameters. In some embodiments, RAID configuration module 252 may include parameters for offloading RAID I/O management, such as RAID stripe allocation and/or mirroring decisions, and/or RAID rebuild management to one or more storage devices 228 and/or other components of storage system 200.

RAID status module 254 may maintain status information for one or more RAID groups in storage system 200. For example, RAID status module 254 may monitor "active", "failed", and/or "rebuilding" status and/or "healthy" or "at risk" status. This status information may assist in allocating new writes, scheduling or triggering data management functions (e.g. data scrub, garbage collection, etc.), identifying a failed or failing storage device, endurance or end-of-life modelling that predicts storage device failure, and/or maintenance decisions of administrators. In some embodiments, RAID status module 254 may trigger response to a failed storage device, such as allocate a hot spare or other storage device connected to storage system 200 to replace the failed storage device in the group or alert an administrator to remove the failed storage device and replace it with a replacement storage device.

I/O settings module 256 may include read/write settings for the RAID groups that respond to RAID status module 254. For example, "active" and/or "healthy" status may enable default read/write settings for production read/write operations to the RAID group, while "failed", "rebuilding", and/or "at risk" status may change the read/write settings for the RAID group. In some embodiments, I/O settings module 256 may communicate changes in read/write availability or handling to other components of storage system 200. For example, I/O settings module 256 may cause hosts 222 to buffer writes in buffers 232 in response to failed and rebuilding status. When a failed storage device is successfully rebuilt and the RAID group is returned to active status, hosts 222 may complete the write operations from buffers 232. Other methods of interrupting read/write operations to rebuilding storage arrays without risk of data loss may be implemented between I/O settings module 256 and other components of storage system 200.

In some embodiments, some or all functions of RAID management system 250 may be offloaded to or integrated into other components of storage system 200. For example, RAID management 250 may be integrated into host nodes 222 and/or storage nodes 224. In some embodiments, one or more functions may be wholly or partially offloaded to storage devices 228. In some embodiments, storage devices 228 may be configured for offloaded RAID management, which may include implementing RAID configuration module 252, RAID status module 254, and/or I/O settings module 256 in one or more peer storage devices.

Figure 3:
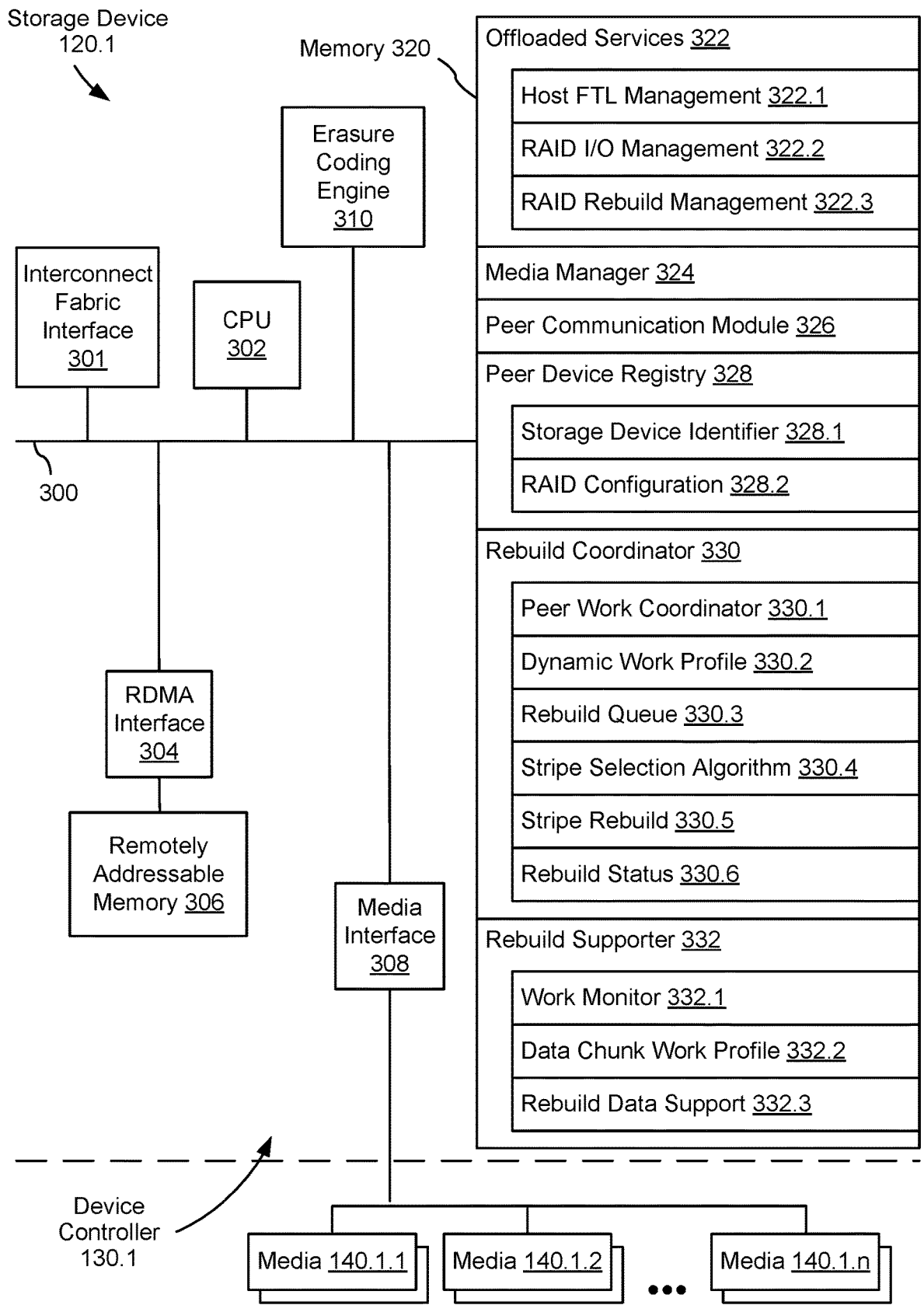
FIG. 3 schematically illustrates an example of a storage device of the peer storage system of FIG. 1.

In some embodiments, as shown in FIG. 3, a storage device 120.1 includes the functions of a device controller 130.1 with peer communication capabilities using compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPUs 302 are shared by one or more components within, and in some cases, beyond the function of storage device 120. The modules in memory 320 and executed by CPU 302 may be coupled to interconnect fabric interface 301, RDMA interface 304, media interface 308, erasure coding engine 310, and any number of additional modules, such as error correction engines, specialized memory modules, etc., in order to coordinate the operation of these components. In some embodiments, the components of storage device 120.1 may be interconnected by one or more communication buses 300. In some embodiments, CPU 302, memory 320, media interface 308, erasure coding engine 310, and any number of additional modules may be packaged as a device controller 130.1, such as an NVM controller, implemented in an application-specific integrated circuit (ASIC), system on a chip (SoC), field programmable gate array (FPGA), or similar architecture.

In some embodiments, storage device 120.1 may be packaged in a housing (not shown in FIG. 3, but see housing 150.1 in FIG. 1), such as a sealed, multipart disk drive housing. For example, device controller 130.1 and media devices 140.1 may be enclosed in the housing. In some embodiments, the housing may have an exterior surface surrounding the internal components, with one or more connectors projecting from or interface ports recessed into the exterior surface. For example, these connectors and/or interface ports may provide physical interconnects for power to and communication with storage device 120.1.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of media controller 130.1), remotely addressable memory 306 (e.g. remotely addressable memory available through a remotely addressable interface), and other specialized memory (not shown). In some embodiments, storage media, such as media devices 140, may provide local memory resources for data management functions, but these may be distinct from storage locations for host data. Example local compute resources may include CPU 302 (e.g. the operating processor of device controller 130.1), erasure coding engines, error correction engines, and any other specialized processing systems. In some embodiments, one or more interfaces, such as interconnect fabric interface 301 or RDMA interface 304, may also include or utilize memory and/or compute resources and may be part of the available local resources of storage device 120.1.

In some embodiments, RDMA interface 304 may be a hardware, software, or combined hardware/software engine for providing remote data management access to remotely addressable memory 306. This may include local direct memory access (DMA) to remotely addressable memory 306 for CPU 302 or other components of device controller 130.1. The RDMA engines of RDMA interface 304 may allow storage device 120.1 to push or pull data from/to remotely addressable memory 306 and to/from memory locations in other storage devices, storage controllers (e.g. storage controller 110), or servers (e.g. host 102).

In some embodiments, erasure coding engine 310 may be a hardware, software, or combined hardware/software engine for providing exclusive-or calculations or implementing another erasure coding operation. Erasure coding engine 310 may support multiple functions stored in memory 320 and/or support XOR or other erasure code processing of data being transferred to or from remotely addressable memory 306, with or without RDMA interface 304. In some embodiments, erasure coding engine 310 may be used to process recovery data, such as paired XOR data and parity data, to calculate the data content of a failed or corrupted data unit.

Additional modules (not shown) supporting one or more functions of storage device 120 may be connected to CPU 302, RDMA interface 304, media interface 308, erasure coding engine 310, and memory 320. In some embodiments, additional module(s) are executed in software by the CPU 302; in other embodiments, additional module(s) are implemented in whole or in part using special purpose circuitry (e.g., to perform encoding and decoding functions).

In some embodiments, during a write operation initiated by a host 102, storage controller 110 receives a host write command (e.g., in a set of one or more host write commands) via interface 112 (FIG. 1), translates that host write command into a write command, sometimes called a translated command or translated write command, suitable for execution by a data storage device 120, and sends the translated host data command to one or more data storage devices corresponding to one more addresses specified by the host write command, a destination storage device.

In some storage systems, a storage controller also receives, via interface 112, data to be stored in the one or more data storage devices corresponding to the one more addresses specified by the host write command. A respective data storage device receives the data to be stored in its media devices 140.1.1-140.1.n, or a portion of the data to be stored, from the storage controller via the interconnect fabric 114. The data received by the storage device may be encoded or otherwise processed and made available to storage media interface 308, which transfers the data to media devices 140.1 in a manner dependent on the type of storage medium being utilized. In storage device 120, RDMA interface 304 and remotely addressable memory 306, sometimes in conjunction with coordination from storage controller 110, may allow host 102 to send the data to be stored in the host write command to remotely addressable memory 306 in storage device 120 without them passing through storage controller 110 or another storage controller.

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis).

In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

In addition, these various memory cell configurations and encoding formats may impact the lifetime performance of storage device 120.1. Flash memory may have defined I/O performance, endurance, write voltage thresholds, error rates, cell/device failures, and other parameters that may be tracked for specific performance values and/or contributions to storage capacity, performance class, endurance, and/or overall health. Similarly, cell usage, read and write load balancing, garbage collection, and other operations may be tracked for endurance, reliability, and failure prediction for media devices 140.

FIG. 3 is a block diagram illustrating example offloaded services, peer communications, and replacement device rebuild handled by storage device 120.1 and its peer storage devices 120, in accordance with some embodiments. Storage device 120.1 includes CPU 302 for executing modules, programs, and/or instructions stored in memory 320 and thereby performing processing operations, memory 320 (sometimes called NVM controller memory, device controller memory, or operating memory), and one or more communication buses 300 for interconnecting these components. The one or more communication buses 300 optionally include circuitry (sometimes called a chipset) that interconnects and controls communications between system components. CPU 302 and memory 320 may be coupled to interconnect fabric interface 301, RDMA interface 304, remotely addressable memory 306, media interface 308, erasure coding engine 310, media devices 140.1, and any additional module(s) by the one or more communication buses 300. In some embodiments, interface hardware and/or protocols for providing communication through communication buses 300 may also be present for communication with any given component.

Memory 320 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or remotely addressable memory 306. These functional memories may include specialized processing, hardware acceleration, and/or other resources related to their function. In some embodiments, remotely addressable memory 306 may be part of memory 320.

Memory 320, or alternatively the non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:

- offloaded services 322 for providing distributed storage management across peer storage devices, including storage device 120.1;
- media manager 324 for managing storage device FTL data (including logical address mapping) and related processes and requests, such as media read and write operations through media interface 308 to media devices 140.1.1-140.1.n;
- peer communication module 326 for communicating command messages and data transfers between storage devices 120 through interconnect fabric interface 301, sometimes using access to remotely addressable memory 306, without the intervention of host 102, storage controller 110, or similarly distinct storage control plane systems;
- peer device registry 328 for identifying the peer storage device identifiers of peer storage devices and/or storing other data management and/or peer services information related to each other storage device;
- rebuild coordinator 330 for coordinating the rebuild of a failed storage device. such as acting as a replacement storage device for rebuilding data into media devices 140.1.1-140.1.n from host and parity data stored on peer storage devices; and
- rebuild supporter 332 for providing replacement data units and/or parity data from media devices 140.1.1-140.1.n to another storage device acting as rebuild coordinator.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

In some embodiments, offloaded services 322 may provide message handling, processing logic, and/or data structures for one or more data management services that may have otherwise been managed by a host controller, storage controller, RAID controller, or other storage control plane system. In some embodiments, a storage control plane device may still have a role in configuring and/or initiating offloaded services 322. For example, a RAID controller may be used for an initial configuration of RAID parameters and provide a common data structure of those parameters for use by storage device 120.1 and its peer storage devices, but the actual allocation and maintenance of RAID stripes for incoming host writes may be managed by offloaded services 322 and related peer communication. Some example offloaded services 322 may include host FTL management 322.1, RAID I/O management 322.2, and RAID rebuild management 322.3.

In some embodiments, host FTL management 322.1 may provide distributed management of host FTL mapping information. For example, a global host FTL data structure may be segmented and divided among peer storage devices to enable the table size to scale with the number of storage devices. Host FTL service commands may be issued by storage devices and/or storage control plane systems and received by host FTL management 322.1 of the storage device that contains the relevant segment of the host FTL data structure. In some embodiments, host FTL management 322.1 may include commands and related services for allocating, querying, and updating the local host FTL data structure.

In some embodiments, RAID I/O management 322.2 may provide distributed management of read, write, and other storage operations to the RAID group and/or peer group that storage device 120.1 is a part of. For example, host data stored in a peer group may be configured according to a RAID configuration that includes mirroring and/or parity calculations for processing write commands. In some embodiments, RAID I/O management 322.2 may utilize host FTL management 322.1 and RAID configuration parameters, such as RAID configuration 328.2 in peer device registry 328, to determine how writes should be allocated among peer storage devices and/or how mirroring and/or parity calculation and updates should be processed. For example, RAID I/O management 322.2 may aggregate data chunks, allocate the data chunks in stripes, and facilitate storage of the data chunks and calculation and storage of corresponding parity data. In some embodiments, RAID I/O management 322.2 may act as a leader device in communication with a host or control plane component. In some embodiments, RAID I/O management 322.2 may be one of a plurality of distributed components among the peer storage devices for receiving and coordinating storage I/O commands.

For example, a RAID stripe configuration (stripe depth, RAID group, storage location selection logic, etc.) and RAID stripe mapping information (to locate specific strips and data recovery dependencies) may be distributed across a peer group. RAID stripe commands may be issued by storage devices and/or storage control plane systems and received by RAID I/O management 322.2 to configure and access RAID stripe information. In some embodiments, RAID I/O management 322.2 may calculate the distribution of host data writes and parity calculation and storage for each RAID stripe it is configured to manage and respond to queries when striped host data needs to be modified or recovered. In some embodiments, RAID I/O management 322.2 may include commands and related services for receiving and updating RAID configurations and supporting logic and data structures, as well as responding to queries related to allocating and/or locating RAID strips and data recovery dependencies.

In some embodiments, RAID I/O management 322.2 may include a function to buffer incoming writes during a rebuild process. For example, in response to a failed drive and the initiation of a rebuild process, RAID I/O management 322.2 may suspend writes to the failed storage device and replacement storage device during the rebuild process. Write operations may also be suspended for corresponding storage locations with recovery data, both parity and other host data used in XOR or similar erasure coding schemes, in other storage devices in the RAID group. RAID I/O management 322.2 may be able to buffer writes within storage device 120.1, across one or more peer storage devices, or to another memory resource, such as a host, controller, or fabric memory.

In some embodiments, RAID rebuild management 322.3 may provide distributed management of the rebuild process for host data protected across multiple storage devices, such as in accordance with a RAID configuration. For example, RAID rebuild management may receive an indication of a failed storage device among the peer group and identify one of the peer storage devices to act as rebuild coordinator or lead storage device for the rebuild. In some embodiments, the rebuild coordinator role may be determined to be the replacement storage device for the storage device that failed, where the rebuild coordinator storage device may have the advantage of rebuilding the host data to media devices 140. RAID rebuild management 322.3 may include generating status information and/or messages to one or more related systems, such as a host system, regarding the availability of the peer group for host read/write operations and/or progress on the rebuild. In some embodiments, RAID rebuild management 322.3 may trigger an indicator in response to the failed storage device to prompt replacement of the failed storage devices with a replacement storage device. In some embodiments, RAID rebuild management 322.3 may be configured for access to one or more hot spares that may be automatically selected and added to the peer group to replace the failed storage device.

In some embodiments, media manager 324 manages access to and maintenance of media devices 140.1. For example, media manager 324 may include base FTL services for storage device 120 and manages the storage device FTL map, as well as read, write, and data management access to media devices 140. Host commands involving host data reads, writes, erases, etc. may be directed by media manager 324 through media interface 308 for accessing media devices 140.1. In some embodiments, host data commands may be pre-processed by other modules, such as offloaded services 322, and related internal data access commands may be received by media manager 324. In some embodiments, storage device FTL provides a base level of FTL mapping for storage device 120. Storage device FTL may include allocation of storage locations with a defined size based on compatibility of with storage units in media devices 140.1, such as page size. For example, storage locations may be allocated as 4 KB or 8 KB pages. In some embodiments, allocation sizes for storage locations may correspond to larger multiplane NVM page sizes, such as 96 KB.

Media manager 324 may be responsible for bad block management, bad block spare overprovisioning, and allocation of gap free logical space throughout the life of the media devices 140.1. In some embodiments, media manager 324 may also include error correction (e.g., low-density parity-check (LDPC) or Bose-Chaudhuri-Hocquenghem (BCH) codes) supported by an error correction engine and tuning of NVM access parameter (e.g., read levels, programming thresholds, etc.). Media manager 324 may enable reads from logical block address (LBA) storage locations in media devices 140 to write in remotely addressable memory 306 and reads from remotely addressable memory 306 to writes in LBA storage locations in media devices 140.1. In some embodiments, media manager 324 may manage data reads and writes to/from media devices 140.1 to support offloaded services 322, rebuild coordinator 330, and/or rebuild supporter 332.

In some embodiments, peer communication module 326 may provide communication among storage devices 120 using interconnect fabric 114 without being routed through storage controller 110 or another host, controller, or storage control plane component. For example, peer communication module 326 may enable drive-to-drive messaging addressed by storage device identifiers, peer-drive broadcasts that provide the same message to all peer storage devices, and/or access to shared memory locations, such as remotely addressable memory 306 for direct data transfer and/or access of host and parity data, data management logs, etc. In some embodiments, packetized messages may be routed among storage devices 120.1 using one or more network communication protocols compatible with interconnect fabric 114 and/or network fabric 104.

In some embodiments, peer communication module 326 operates in conjunction with RDMA interface 304 to manage local and remote use of remotely addressable memory 306. For example, local operations by media manager 324 may include writes and reads to remotely addressable memory 306, read/write operations may include coordinated use of space in remotely addressable memory 306 for both local and remote access, and other distributed operations may use space in remotely addressable memory 306 as requested by storage controller 110 or other storage devices.

In some embodiments, peer device registry 328 may be a data structure for maintaining information regarding each other peer storage device in a peer group, such as storage devices 120 in peer group 106. For example, peer device registry 328 may be a table, list, array, database, or similar data structure for storing storage device identifiers 328.1, other addressing information, RAID configuration 328.2, and/or additional information on peer storage devices, such as specifications and/or parameters of the storage devices. In some embodiments, storage device identifier 328.1 may include or translate into a network compatible device address for routing data frames from storage device 120.1 to a selected peer storage device.

In some embodiments, peer device registry 328 may include storage device identifiers 328.1 for each storage device corresponding to a peer group shared with storage device 120.1. For example, storage device 120.1 may belong to peer group A and each other storage device 120 in peer group A may have an entry in peer device registry 328 with a storage device identifier 328.1 for addressing peer communications. For example, each storage device may have an entry (e.g. a row in a table) with a key (e.g. storage device identifier) and a field (e.g. column in a table) for one or more peer group identifiers.

In some embodiments, peer device registry 328 may identify RAID configuration information 328.2 for mapping recovery data relevant to host data stored in storage device 120.1 (and/or other storage devices 120 in peer group 106). For example, one or more devices in peer group 106 may participate in a RAID group and contain RAID stripe data (parity data and/or corresponding paired host data) and RAID configuration information 328.2 may identify which peer storage devices are in the RAID group. In some embodiments, RAID configuration information 328.2 may include RAID stripe parameters, such as stripe depth and chunk size, and/or RAID stripe mapping information for enabling storage device 120.1 to locate recovery data needed for data block or storage device rebuild. For example, a peer group may be configured in RAID 5 with a defined RAID 5 chunk size as a rebuild data unit.

In some embodiments, rebuild coordinator 330 may be instantiated in software code stored in memory 320 and executed by processor 302 to enable storage device 120.1 to act in the rebuild coordinator role for the rebuild of one or more failed storage devices or storage locations. For example, when a storage device in the peer group that is configured for a data protection scheme with other storage devices in the group has failed and been replaced, one or more of the storage devices may invoke rebuild coordinator 330 to govern rebuild of the replacement drive. In some embodiments, a newly installed replacement storage device or newly activated hot spare may initiate rebuild coordinator 330. In some embodiments, rebuild coordinator 330 may include a peer work coordinator 330.1, a dynamic work profile 330.2, a rebuild queue 330.3, a stripe selection algorithm 330.4, a stripe rebuild module 330.5, and a rebuild status module 330.6.

In some embodiments, peer work coordinator 330.1 may include logic, data structures, messaging, and/or interfaces for requesting tasks from peer storage devices and coordinating responses with the actions of other modules in rebuild coordinator 330. For example, peer work coordinator 330.1 may issue work queries to peer storage devices for building dynamic work profile 330.2 and issue rebuild data commands for stripe rebuild module 330.5. Peer work coordinator 330.1 may receive responses with data chunk work profiles 332.3 and rebuild data from the peer storage devices. In some embodiments, peer work coordinator 330.1 may use information from peer device registry 328, such as storage device identifiers 328.1 and RAID configuration information 328.2, and peer communication module 326 to identify and communicate with selected peer storage devices to complete rebuild tasks. Peer work coordinator 330.1 may also be responsible for maintaining state information and/or variables and data structures that support the operations of multiple other modules in rebuild coordinator 330.

In some embodiments, dynamic work profile 330.2 may be a data structure and related queries and functions for assembling busyness information for each peer storage device involved in a rebuild process. For example, dynamic work profile 330.2 may include one or more busyness values for each peer storage device in a RAID group that quantifies the number and/or resource commitments of read/write and/or other storage operations being performed by each peer storage device. In some embodiments, the busyness value may include the command queue count for each RAID chunk. Dynamic work profile 330.2 may be an array or table of values mapping the busyness of a plurality of storage devices involved in a peer data rebuild, such as a RAID rebuild for a failed storage device. In some embodiments, dynamic work profile 330.2 may include busyness values mapped to the rebuild data block level for each storage device such that each storage device provides a work profile with a plurality of values for each rebuild data unit in that storage device and/or related to a specific query for work status data. An example work profile data structure may be work status data entries organized by grouping information, such as the RAID group and/or RAID stripe identifier, indexed by a target data block identifier, such as a logical block address (LBA) or range or series of LBAs, for the RAID data chunk, and including busyness values or other work profile data corresponding to the RAID data chunk.

In some embodiments, dynamic work profile 330.2 may be based on historic work profiles updated through queries or periodic reporting from peer storage devices to update the busyness values based on work status data. For example, peer storage devices may maintain busyness values for each other peer storage device in each peer device registry 328 and receive periodic updates including work status data. In some embodiments, dynamic work profile 330.2 may be generated and/or updated during a rebuild process based on work data queries and responses. For example, peer work coordinator 330.1 may send work data queries to build dynamic work profile 330.2 for use in ordering RAID stripes and data units within those RAID stripes for rebuild data requests and stripe rebuild. In some embodiments, dynamic work profile 330.2 may be generated once during a rebuild process and in others it may be continuously or periodically updated based on repeated communication with peer devices for their work status data. For example, work status data may include a metadata table or array of busyness values, such as enqueued command count, for the rebuild data units (such as RAID 5 chunks) in a particular storage device, where the metadata may be queried by a peer storage device, such as using a vendor specific command.

In some embodiments, work status data for a given storage device may include a queue depth of host read/write operations awaiting processing by that storage device. Other work status data may include quantification of memory or processor usage, quantification of host read/write by metrics other than number of operations (such as blocks or MBs in queue), time or processing remaining on an administrative task (such as garbage collection, data scan, defragmentation, etc.), work remaining for previously issued RAID-related requests (such as parity calculation, data rebuild, or transfer of rebuild data), etc. Work status data may be processed through one or more algorithms or transfer functions for calculating one or more busyness values for comparing the relative busyness among peer storage devices and assisting in ordering the rebuild operation. Dynamic work profile 330.2 may map the work status data and/or resulting busyness values to each of the peer storage devices involved in the rebuild operation.

In some embodiments, rebuild queue 330.3 may include a function and/or data structure for determining the next rebuild data unit or set of rebuild data units to be rebuilt as part of a data rebuild operation. For example, rebuild queue 330.3 may order the RAID stripes and/or data chunks within those RAID stripes for processing by stripe rebuild module 330.5. In some embodiments, rebuild queue 330.3 uses dynamic work profile 330.2 to determine the availability of peer storage devices and/or rebuild data units within those peer storage devices and order rebuild requests for selected rebuild data units. For example, dynamic work profile 330.2 may be used to order the rebuild requests for rebuild data units in a stripe from the highest availability (or lowest workload or busyness value) to lowest availability (or highest workload or busyness value). Peer devices with high availability may be able to respond immediately and the availability of busy peer devices may change by the time their data unit is needed. Alternate and more complex algorithms for selecting the next data unit may also be implemented based on other workload and resource availability predictions.

In some embodiments, rebuild queue 330.3 may use a stripe selection algorithm 330.4 to determine the order in which related protection data units are rebuilt. For example, in a RAID configuration that has 10 RAID stripes across different combinations of peer storage devices, stripe selection algorithm 330.4 may be used to evaluate, rank, or order the 10 RAID stripes to determine which stripe should be rebuilt next. In some embodiments, stripe selection algorithm 330.4 may be applied to the busyness values from dynamic work profile 330.2 that map to each storage device and rebuild data unit for the stripe to generate an aggregate work profile for rebuilding the stripe. In some embodiments, the aggregate work profile may be a mean, sum, or other transfer function of the work profiles or busyness values of the rebuild data units in the set of storage devices associated with the stripe. Where the aggregate work profile does not indicate a priority between RAID stripes, such as two stripes with equal aggregate work profiles, an alternate selection criteria may be used, such as the first in a RAID configuration order, random selection, sequential with a prior or next stripe, and/or using another RAID rebuild stripe prioritization scheme.

In some embodiments, stripe rebuild module 330.5 may include functions, messages, interfaces, and/or data structures that use the stripe order and rebuild data unit order from rebuild queue 330.3 to execute the rebuild of the target recovery data units. For example, stripe rebuild module 330.5 may access rebuild data chunks (host data and/or parity data) from peer storage devices and generate recovered data chunks for storage to media devices 140 (or other destination media if the rebuild coordinator is not the drive being rebuilt). In some embodiments, stripe rebuild module 330.5 may use a rebuild data request or command sent to the peer storage device to receive the requested rebuild data unit. In some embodiments, strip rebuild module 330.5 may use a data access command associated with remotely addressable memory 306 in either or both of the storage device currently storing the rebuild data unit and the storage device receiving the rebuild data unit for rebuild. In some embodiments, stripe rebuild module 330.5 may use erasure coding engine 310 to XOR received rebuild data units and calculate the target recovered data units for the rebuild.

In some embodiments, rebuild status module 330.6 may include functions, messages, interfaces, and/or data structures that monitor and publish the status of the rebuild operation. For example, rebuild status module 330.6 may maintain one or more status values, status tables, or similar metadata containing rebuild progress information, such as identifying RAID stripes rebuilt and RAID stripes in queue for rebuild. Rebuild status module 330.6 may include a top-level status with a plurality of possible values, such as "device failed", "replacement device online", "rebuilding", "rebuild complete", or "rebuild failed". Rebuild status module 330.6 may maintain status related information for access by other systems and functions and/or may actively send status information to registered systems or components, such as RAID rebuild management 322.3 on the same storage device or a peer storage device.

In some embodiments, rebuild supporter 332 may be instantiated in software code stored in memory 320 and executed by processor 302 to enable storage device 120.1 to act as a supporting peer storage device for the rebuild of one or more failed storage devices or storage locations. For example, storage device 120.1 may be in a peer group where another storage device has failed and been replaced and that storage device may be acting as rebuild coordinator for a rebuild operation. Rebuild supporter 332 may provide work status data to support coordination of the rebuild operation and provide rebuild data units needed for rebuilding target data units. In some embodiments, rebuild supporter 332 may include a work monitor 332.1, a data chunk work profile 332.2, and a rebuild data support module 332.3.

In some embodiments, work monitor 332.1 may include functions, messages, interfaces, and/or data structures that monitor the read, write, and/or other storage operations of storage device 120.1 to map busyness values and generate data chunk work profile 332.2. For example, work monitor 332.1 may monitor one or more storage operation queues maintained by storage device 120.1 for processing read, write, delete, data maintenance, and other host commands. For example, storage device 120.1 may maintain an operations queue that identifies storage operations and the target LBAs or other addressing information for those storage operations. Work monitor 332.1 may parse the operation queue to generate a command count for each data chunk or similar logical data group using the addressing information.

Data chunk work profile 332.2 may include functions, messages, interfaces, and/or data structures that store one or more work profiles for rebuild data units stored in media devices 140 and make them available to peer storage devices. For example, data chunk work profile 332.2 may include a table or array of busyness values stored in metadata for locally stored data chunks and provide an interface or message handling to provide that information (or subsets thereof) to peer storage devices. In some embodiments, data chunk work profile 332.2 may publish work profiles to a data store that may be queried by peer storage devices, such as through a vendor specific command addressed to storage device 120.1 using peer communication module 326. In some embodiments, data chunk work profile 332.2 may be broadcast to the peer storage devices in its group during a rebuild operation or based on some other trigger or continuous status information.

In some embodiments, rebuild data support module 332.3 may include functions, messages, interfaces, and/or data structures that enable transfer of rebuild data units to the storage device being rebuilt. For example, rebuild data support module 332.3 may include an interface for responding to rebuild data transfer commands from peer storage devices. Rebuild data support module 332.3 may use media manager 324 to transfer data chunks from media devices 140 remotely addressable memory 306 are another read cache for transfer to a destination peer storage device, such as the peer storage device in the rebuild coordinator role or another replacement storage device.

Figure 4:
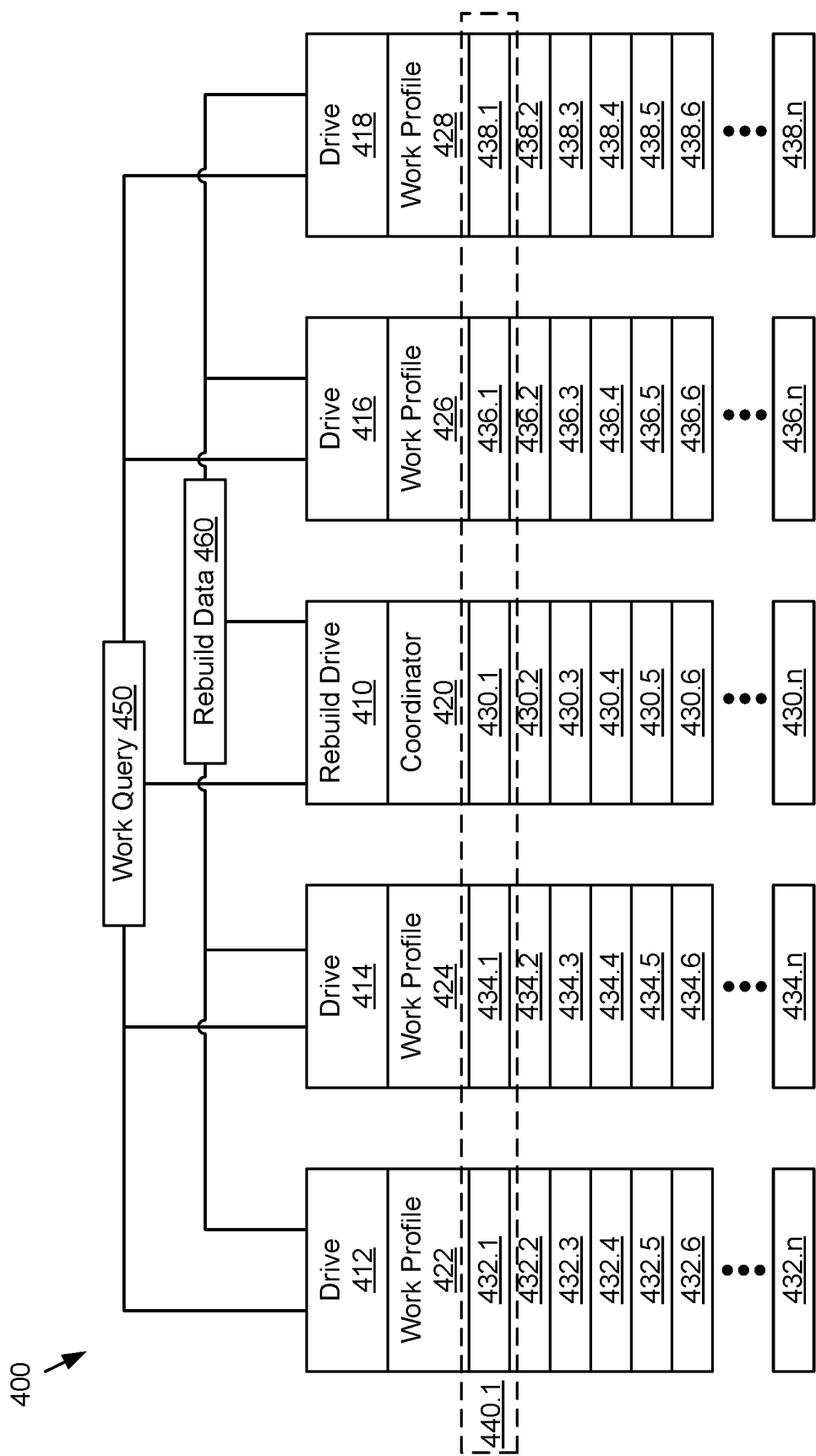
FIG. 4 schematically illustrates data rebuild across a peer group of storage devices, such as the storage device in FIG. 3.

As shown in FIG. 4, a peer group 400 may be configured as a RAID group in RAID 5. The storage devices in peer group 400 may include a rebuild drive 410 and four healthy drives 412, 414, 416, 418. In some embodiments, each drive 410, 412, 414, 416, 418 may be a storage device configured similarly to storage device 140.1 in FIG. 3 and may operate in a storage system similar to storage system 100 in FIG. 1. In the example shown, a drive in the same position as rebuild drive 410 may have recently failed and been replaced with rebuild drive 410. A rebuild operation may be initiated to rebuild the lost data from the failed drive onto rebuild drive 410.

Rebuild drive 410 may be selected as rebuild coordinator 420 and use work profiles 422, 424, 426, 428 stored in metadata on respective healthy drives 412, 414, 416, 418. Rebuild drive 410 may use work query 450 to retrieve work status data from drives 412, 414, 416, 418 and build a dynamic work profile mapping the work profiles of each data chunk 432.1-432.$n$, 434.1-434.$n$, 436.1-436.$n$, 438.1-438.$n$. The work profiles may then be used to determine the order in which RAID stripes, such as RAID stripe 440.1, may be used to rebuild target data chunks 430.1-430.$n$, such as target data chunk 430.1. Rebuild data 460 may be transferred from each of drives 412, 414, 416, 418 to calculate the data to be recovered on rebuild drive 410.

Figure 5:
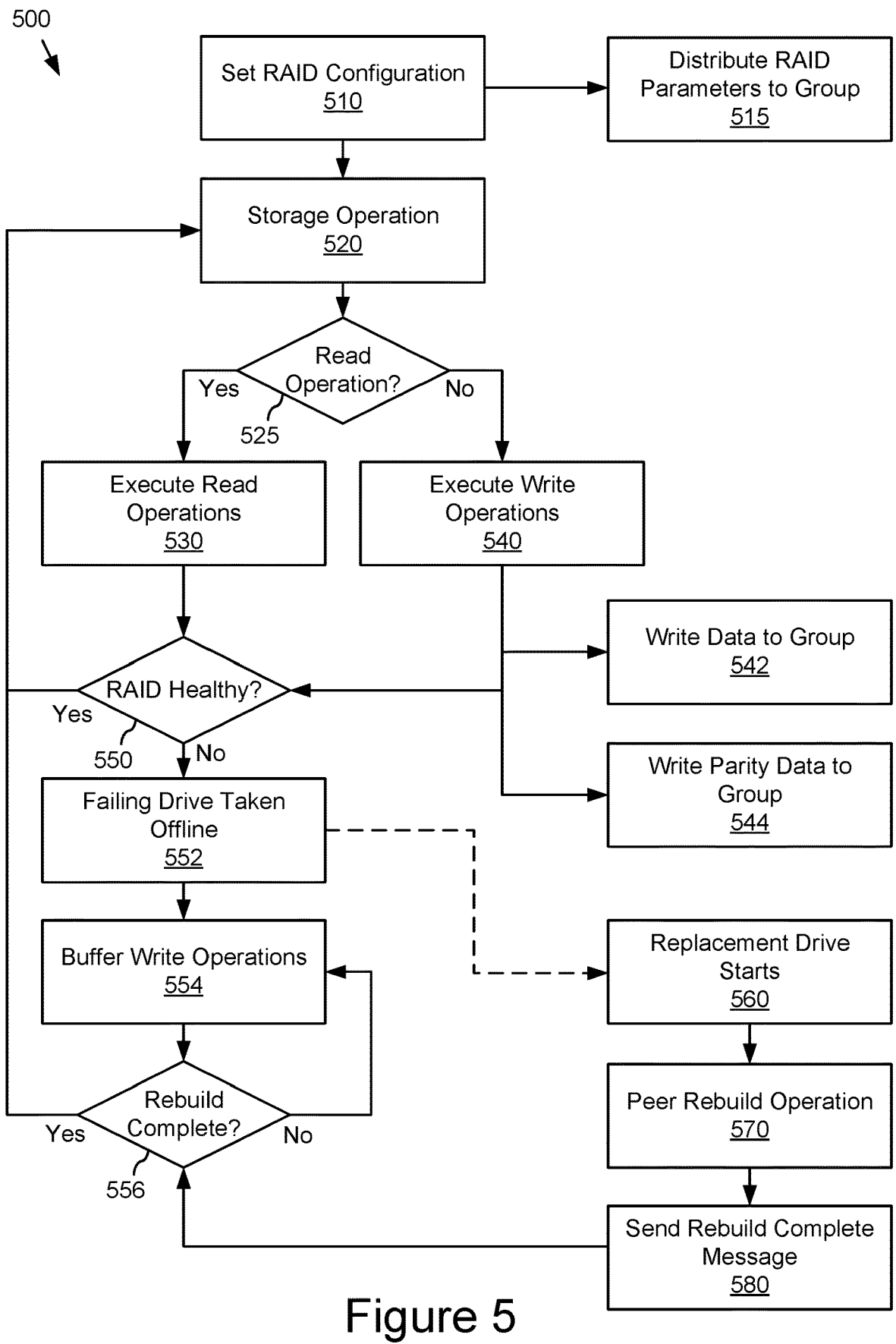
FIG. 5 illustrates an example of a method for peer rebuild in a RAID configuration.

As shown in FIG. 5, a data storage system 100 may be operated with peer data storage devices 120 to implement a data protection configuration with peer rebuild capabilities. For example, data storage system 100 may manage read/write operations to the peer group and initiate rebuild operations when one or more peer storage devices (e.g. storage devices 120) fail according to the method 500 illustrated by blocks 510-580 of FIG. 5.

At block 510, a RAID configuration may be set for a group of peer storage devices to create a RAID group among them. For example, a storage array may be configured with peer communication among storage devices and implement RAID 5 data protection across the peer group.

At block 515, RAID parameters may be distributed to the RAID group. For example, each peer storage device may receive and store peer device identifiers, RAID configuration parameters (e.g., stripe depth, chunk size, erasure coding scheme, allocation algorithm and/or stripe mapping index), and other parameters relevant to the peer storage devices' roles in RAID I/O management, rebuild management, rebuild coordination, and rebuild support.

At block 520, a storage operation is received for the RAID group. For example, a read, write, or other storage operation may be received from a host system. The storage operation may be evaluated for whether it is a read or write operation at block 525. If the storage operation is a read operation (or requires a read operation to complete), method 500 may continue to block 530. If the storage operation is not a read operation (such as a write operation), method 500 may continue to block 540.

At block 530, read operations may be executed against the RAID group and, at block 540, write operations may be executed against the RAID group. For example, host data may be written to the peer group at block 542 and corresponding parity data may be written to the peer group at 544 in accordance with the RAID configuration.

Whether a read operation or a write operation, at block 550, the health of the RAID group may be verified. For example, each peer storage device and/or a RAID management service may report on whether all storage devices are responding and/or more complex device status or health metrics, such as read/write failure rates or error rates, compared against a health metric threshold. If the RAID group is healthy, method 500 may return to block 520 for a next storage operation. If the RAID group is not healthy, method 500 may proceed to block 552.

At block 552, the failing (or failed) storage device is taken offline. For example, the failed drive may be removed from its position in the storage system and either physically replaced with a new, healthy drive or logically replaced by rerouting its configuration or role to a hot spare in another position in the storage system. Replacement of the failed drive when the failing drive is taken offline may initiate block 560.

At block 554, write operations may be buffered while the replacement drive is being rebuilt. For example, incoming write operations may be buffered in a write cache or similar buffer in the storage system until the RAID group is returned to healthy status. In some embodiments, read operations against data still available in the RAID group may be processed and returned. At block 556, buffering of write operations may continue by returning to block 554 if the rebuild is not complete. Method 500 may return to block 520 when the rebuild is complete.

At block 560, a replacement storage device for the RAID group starts. For example, upon initiation, the replacement storage device may be configured as a peer storage device and receive the RAID parameters used by the RAID group. The replacement drive may be configured to automatically act as rebuild coordinator upon startup.

At block 570, a peer rebuild process may be executed by the peer storage devices in the RAID group. For example, a rebuild coordinator among the peer storage devices may oversee transfer of RAID data chunks and calculation of host data and/or parity data (collectively, target data units) to be rebuilt and stored on the replacement storage device.

At block 580, a rebuild complete message or similar indicator or trigger may be sent or generated. For example, a rebuild complete message may be sent to a RAID management function and/or I/O management function to indicate that the rebuild has completed and the RAID group may be returned to normal read/write operation.

Figure 6:
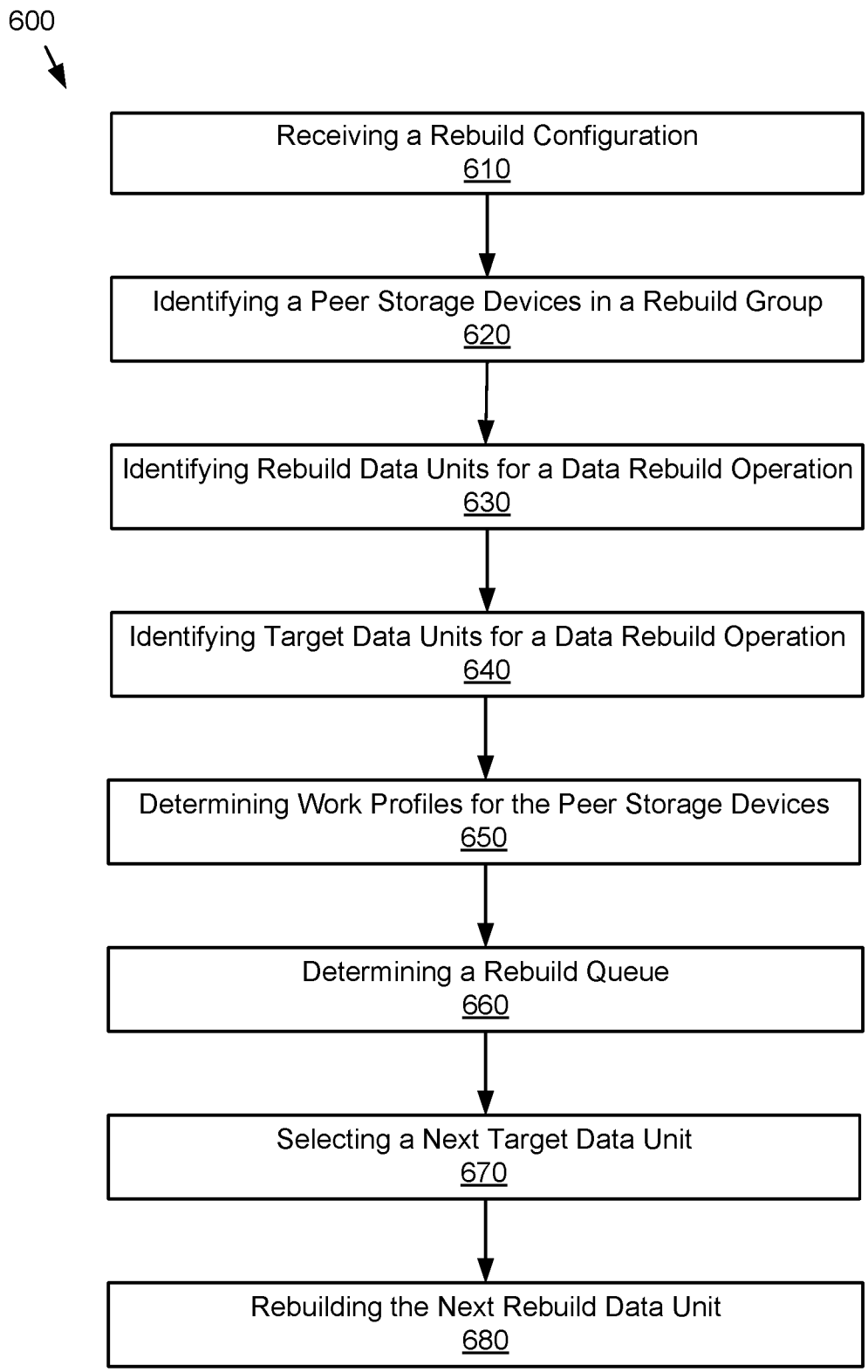
FIG. 6 illustrates an example of a method for peer rebuild using peer work profiles.

As shown in FIG. 6, storage device 120.1 operating within data storage system 100 may be operated according to a storage device rebuild process in response to a drive failure. For example, storage device 120.1 may act as a rebuild coordinator and rebuild a plurality of rebuild data units according to the method 600 illustrated by blocks 610-680 of FIG. 6.

At block 610, a rebuild configuration may be received. For example, following the failure of a storage device in a peer group configured as a RAID group, the rebuild process may be initiated by a replacement storage device receiving RAID configuration information for the RAID group. In some embodiments, the rebuild configuration may also identify a rebuild coordinator role among the peer storage devices.

At block 620, the peer storage devices in the rebuild group may be identified. In some RAID configurations, every peer storage device in the peer group may be part of the RAID group and may include data relevant to the rebuild. In other RAID configurations, a subset of peer storage devices may participate in the RAID group and/or include data relevant to the rebuild. Identification of the peer storage devices in the rebuild group may include the generation of a list of peer device identifiers containing RAID data chunks for the data rebuild operation.

At block 630, the rebuild data units for the data rebuild operation may be identified. For example, a list of RAID stripes to be rebuilt from the healthy storage devices may be generated for use in managing the data rebuild operation. Each RAID stripe may correspond to recoverable data units, such as host data and/or parity data that was stored in the corresponding RAID stripe on the failed storage device.

At block 640, the target data units for the data rebuild operation may be identified. For example, a list of RAID data chunks in the peer storage devices corresponding to the list of RAID stripes may be generated for use in managing the data rebuild operation.

At block 650, work profiles for each of the peer storage devices may be received. For example, each peer storage device may be queried for a work profile describing the busyness of each RAID data chunk in the list of target data units from block 640.

At block 660, a rebuild queue for the rebuild operation may be determined based on the work profiles determined at block 650. For example, the rebuild queue may rank the RAID stripes by their aggregate busyness and rank the RAID data chunks within each RAID stripe according to their busyness to determine a rebuild order for the rebuild queue. In some embodiments, determining the rebuild queue may be a dynamic and iterative process where the next RAID stripe is selected and the RAID data chunks ordered based in the current work profiles and the work profiles are updated and the RAID stripes reordered before the next RAID stripe is selected from the list.

At block 670, the next target data unit from the healthy storage devices is selected based on the rebuild queue. For example, once a RAID stripe is selected, a RAID data chunk from the stripe may be selected and transferred to the processing location where the RAID data chunk will be used to calculate the missing host data and/or parity data.

At block 680, the next rebuild data unit may be rebuilt and the recoverable data unit stored in the replacement storage device. For example, two or more RAID data chunks may be selected at block 670 corresponding to a RAID stripe and used to calculate the host data and/or parity data for the recoverable data unit.

Figure 7:
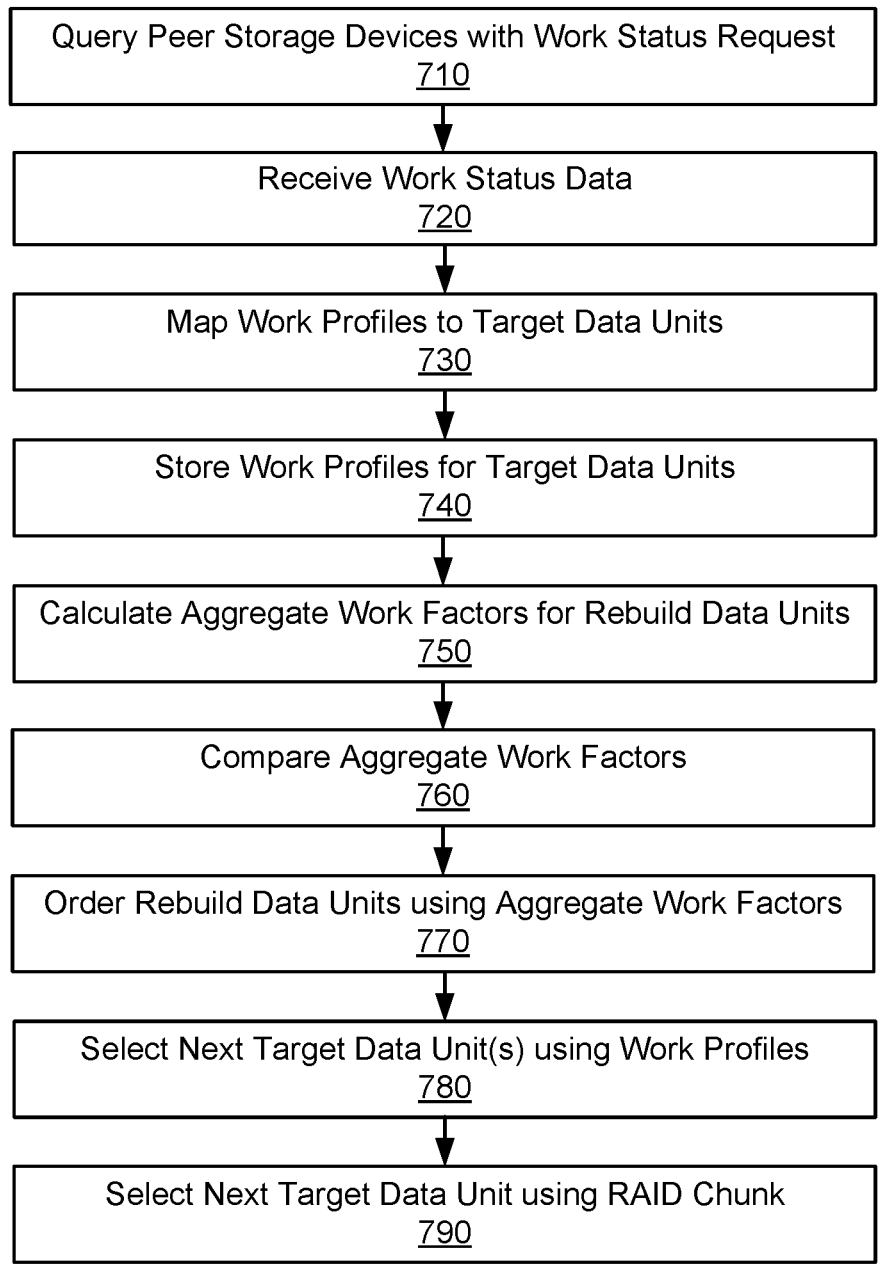
FIG. 7 illustrates an example of a method for ordering data units for a peer rebuild using work profiles.

As shown in FIG. 7, storage device 120.1 operating within data storage system 100 may be operated according to a storage device rebuild process in response to a drive failure that uses work status data to coordinate the rebuild operation. For example, storage device 120.1 may act as a rebuild coordinator and rebuild a plurality of rebuild data units ordered according to the method 700 illustrated by blocks 710-790 of FIG. 7.

At block 710, peer storage devices may be queried with a work status request. For example, each peer storage device may make busyness values, such as a count of enqueued read/write commands, for each of its target data units available through a work status request.

At block 720, the work status data may be received from each of the peer storage devices. For example, each peer storage device may return the busyness values as work status data in response to the work status request. The rebuild coordinator may organize the work status data into work profiles for each of the peer storage devices.

At block 730, the work status data may be mapped to the target data units to generate work profiles. For example, a dynamic work profile for all of the target data units may be generated with at least one busyness value for each target data unit responsive to the work status data received from the peer storage devices at block 720.

At block 740, the work profiles for the target data units are stored for use in subsequent blocks. For example, the work profiles may be stored as a dynamic work profile for the RAID rebuild operation in a memory of the rebuild coordinator.

At block 750, aggregate work factors may be calculated for rebuild data units. For example, based on the work profiles, the busyness value for each RAID data chunk in a RAID stripe may be summed or otherwise combined to generate the aggregate work factor.

At block 760, aggregate work factors for two or more rebuild data units may be compared. For example, the aggregate work factor for each RAID stripe may be compared to one another.

At block 770, the rebuild data units may be ordered for rebuild using the aggregate work factors. For example, the aggregate work factor for each RAID stripe compared at block 760 may enable the RAID stripes to be placed in order from least busy to most busy and/or to select the next least busy RAID stripe for processing.

At block 780, the next target data unit(s) may be selected using the work profiles. For example, each RAID chunk in the next RAID stripe may be sorted according to their busyness values and the least busy RAID chunk may be retrieved or otherwise processed first.

At block 790, where two target data units have the same work profiles, the next target data unit may be selected based on least index RAID chunk. For example, each RAID chunk may have an associated index value and where two data chunks in the same RAID stripe have the same busyness values, the priority for processing may be given to the least index RAID chunk or least index target data unit. The RAID chunk with the next least index value may be selected.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device, comprising:
   a processor;
   a memory;
   at least one storage medium;
   an interface configured to communicate with a plurality of peer storage devices over a peer communication channel, wherein:
      the peer communication channel enables the plurality of peer storage devices to directly transfer, over an interconnect fabric, data units to other peer storage devices among the plurality of peer storage devices; and
      the plurality of peer storage devices each include a plurality of target data units for a data rebuild operation; and
   a rebuild coordinator stored in the memory and executable by the processor to perform operations comprising:
      identifying, for each peer storage device from the plurality of peer storage devices, the plurality of target data units for the data rebuild operation;
      determining, using the peer communication channel to communicate with the plurality of peer storage devices, work profiles for each peer storage device of the plurality of peer storage devices, wherein the work profiles are based on at least one command queue count for at least one target data unit in each peer storage device;
      mapping the work profiles for each peer storage device of the plurality of peer storage devices to the plurality of target data units for the data rebuild operation;
      determining a rebuild queue for the data rebuild operation by:
         comparing the work profiles corresponding to each target data unit of the plurality of target data units; and
         ordering, responsive to comparing the work profiles, a plurality of rebuild data units corresponding to the plurality of target data units; and
      rebuilding, using the peer communication channel, the plurality of rebuild data units according to the rebuild queue.

2. The storage device of claim 1, wherein:
   the rebuild coordinator is further executable to perform operations comprising:
      identifying a first peer storage device from the plurality of peer storage devices, wherein the first peer storage device includes a first target data unit for the data rebuild operation;
      determining, using the peer communication channel to communicate with the first peer storage device, a first work profile for the first peer storage device;
      identifying a second peer storage device from the plurality of peer storage devices, wherein the second peer storage device includes a second target data unit for the data rebuild operation; and
      determining, using the peer communication channel to communicate with the second peer storage device, a second work profile for the second peer storage device;
   the first work profile is based on a first command queue count for the first target data unit in the first peer storage device;

the second work profile is based on a second command queue count for the second target data unit in the second peer storage device; and determining the rebuild queue includes:
ordering, based on a comparison of the first work profile and the second work profile, the plurality of rebuild data units.

3. The storage device of claim 1, wherein determining the work profile for each peer storage device of the plurality of peer storage devices includes:
querying the peer storage device with a work status request;
receiving, in response to the work status request, work status data; and
storing the work status data in the work profile.

4. The storage device of claim 3, wherein:
the work status data includes a command queue count for each of the plurality of target data units in the peer storage device.

5. The storage device of claim 1, wherein:
comparing the work profiles includes calculating aggregate work factors for each rebuild data unit of the plurality of rebuild data units, wherein each aggregate work factor is based on the work profiles corresponding to target data units in a corresponding rebuild data unit; and
ordering the plurality of rebuild data units is based on ordering aggregate work factors from lowest to highest.

6. The storage device of claim 5, wherein:
the plurality of peer storage devices is configured as a redundant array of independent disks (RAID) array;
the plurality of rebuild data units are a plurality of RAID stripes; and
the plurality of target data units are RAID chunks.

7. The storage device of claim 1, further comprising:
a work profile data structure, comprising:
logical block addresses for the plurality of target data units;
grouping information for the plurality of rebuild data units; and
busyness values for the plurality of target data units.

8. The storage device of claim 1, wherein the rebuild coordinator is further configured to rebuild the rebuild data units in the at least one storage medium.

9. A computer-implemented method, comprising:
identifying a plurality of peer storage devices, wherein:
each peer storage device of the plurality of peer storage devices is configured to communicate over a peer communication channel;
the peer communication channel enables the plurality of peer storage devices to directly transfer, over an interconnect fabric, data units to other peer storage devices among the plurality of peer storage devices; and
the plurality of peer storage devices includes a plurality of target data units for a data rebuild operation;
querying, using the peer communication channel to communicate with the plurality of peer storage devices, each peer storage device for work status data, wherein the work status data includes at least one command queue count for at least one target data unit in each peer storage device;
determining, based on the work status data, a work profile for each peer storage device;
mapping the work profiles for each peer storage device to the plurality of target data units for the data rebuild operation;

comparing the work profiles corresponding to each target data unit;
determining, responsive to comparing the work profiles, a rebuild queue for the data rebuild operation, wherein the rebuild queue orders a plurality of rebuild data units for the data rebuild operation;
selecting a next rebuild data unit for the data rebuild operation from the rebuild queue; and
rebuilding the next rebuild data unit.

10. The computer-implemented method of claim 9, further comprising:
identifying a first peer storage device from the plurality of peer storage devices, wherein the first peer storage device includes a first target data unit for the data rebuild operation;
determining a first work profile for the first peer storage device, wherein the first work profile is based on a first command queue count for the first target data unit in the first peer storage device;
identifying a second peer storage device from the plurality of peer storage devices, wherein the second peer storage device includes a second target data unit for the data rebuild operation;
determining a second work profile for the second peer storage device, wherein the second work profile is based on a second command queue count for the second target data unit in the second peer storage device; and
comparing the first work profile to the second work profile, wherein selecting the next rebuild data unit is responsive to comparing the first work profile to the second work profile.

11. The computer-implemented method of claim 9, wherein determining the work profile for each peer storage device includes:
querying the peer storage device with a work status request;
receiving, in response to the work status request, the work status data; and
storing the work status data in the work profile for the peer storage device.

12. The computer-implemented method of claim 11, wherein:
each peer storage device includes a plurality of target data units for the data rebuild operation; and
the work status data includes a command queue count for each target data unit of the plurality of target data units in each peer storage device.

13. The computer-implemented method of claim 9, further comprising:
calculating aggregate work factors for each rebuild data unit of the plurality of rebuild data units, wherein each aggregate work factor is based on the work profiles corresponding to target data units in a corresponding rebuild data unit; and
ordering aggregate work factors from lowest to highest, wherein determining the rebuild queue is responsive to ordering aggregate work factors.

14. The computer-implemented method of claim 9, wherein:
the plurality of peer storage devices is configured as a redundant array of independent disks (RAID) array;
the plurality of rebuild data units are a plurality of RAID stripes; and
the plurality of target data units are RAID chunks.

15. The computer-implemented method of claim 9, further comprising:
configuring a replacement storage device in the plurality of peer storage devices as rebuild coordinator, wherein the rebuild coordinator executes:
querying each peer storage device of the plurality of peer storage devices for work status data;
determining the work profile for each peer storage device;
mapping the work profiles for each peer storage device to the plurality of target data units for the data rebuild operation;
comparing the work profiles corresponding to each target data unit;
determining the rebuild queue for the data rebuild operation;
selecting the next rebuild data unit for the data rebuild operation from the rebuild queue; and
rebuilding the next rebuild data unit; and
storing the rebuild data units in at least one storage medium of the replacement storage device.

16. A storage system, comprising:
a plurality of peer storage devices, wherein at least one peer storage device of the plurality of peer storage devices comprises:
an interface configured to communicate among the plurality of peer storage devices over a peer communication channel, wherein the peer communication channel enables the plurality of peer storage devices to directly transfer, over an interconnect fabric, data units to other peer storage devices among the plurality of peer storage devices;
means for identifying the plurality of peer storage devices, wherein the plurality of peer storage devices includes a plurality of target data units for a data rebuild operation;
means for determining, using the peer communication channel to communicate with the plurality of peer storage devices, work profiles for each peer storage device of the plurality of peer storage devices, wherein the work profiles are is based on at least one command queue count for at least one target data unit in each one peer storage device;
means for mapping the work profiles for each peer storage device of the plurality of peer storage devices to the plurality of target data units for the data rebuild operation;
means for determining, based on the work profiles, a rebuild queue for the data rebuild operation, wherein the rebuild queue orders a plurality of rebuild data units for the data rebuild operation;
means for selecting a next rebuild data unit for the data rebuild operation from the rebuild queue; and
means for rebuilding the next rebuild data unit.

17. The storage system of claim 16, wherein the at least one peer storage device of the plurality of peer storage devices further comprises:
means for identifying a first peer storage device from the plurality of peer storage devices, wherein the first peer storage device includes a first target data unit for the data rebuild operation;
means for determining a first work profile for the first peer storage device, wherein the first work profile is based on a first command queue count for the first target data unit in the first peer storage device;
means for identifying a second peer storage device from the plurality of peer storage devices, wherein the second peer storage device includes a second target data unit for the data rebuild operation;
means for determining a second work profile for the second peer storage device, wherein the second work profile is based on a second command queue count for the second target data unit in the second peer storage device; and
means for comparing the first work profile to the second work profile, wherein selecting the next rebuild data unit is responsive to comparing the first work profile to the second work profile.

18. The storage system of claim 16, wherein the means for determining the work profiles for each peer storage device includes:
means for querying the peer storage device with a work status request;
means for receiving, in response to the work status request, work status data; and
means for storing the work status data in the work profile for the peer storage device.

19. The storage system of claim 18, wherein:
each peer storage device includes a plurality of target data units for the data rebuild operation; and
the work status data includes a command queue count for each target data unit of the plurality of target data units in each peer storage device.

20. The storage system of claim 16, wherein the means for determining the rebuild queue includes:
means for calculating aggregate work factors for each rebuild data unit of the plurality of rebuild data units, wherein each aggregate work factor is based on the work profiles corresponding to target data units in a corresponding rebuild data unit; and
means for ordering aggregate work factors from lowest to highest, wherein determining the rebuild queue is responsive to ordering aggregate work factors.

* * * * *